United States Patent [19]
Hanaoka

[11] Patent Number: 5,877,770
[45] Date of Patent: Mar. 2, 1999

[54] TEXTURE PATTERN MEMORY CIRCUIT FOR PROVIDING PLURAL TEXEL DATA IN RESPONSE TO A SINGLE ACCESS OPERATION

[75] Inventor: Toshiharu Hanaoka, Chiba, Japan

[73] Assignee: Sharp Kabushiki Kaisha, Osaka, Japan

[21] Appl. No.: 634,806

[22] Filed: Apr. 19, 1996

[30] Foreign Application Priority Data

May 24, 1995 [JP] Japan .................................. 7-125384

[51] Int. Cl.⁶ .................................................. G06T 11/40
[52] U.S. Cl. ........................................... 345/430; 345/515
[58] Field of Search .................................. 395/125, 130;
345/425, 430, 515, 516, 517

[56] References Cited

U.S. PATENT DOCUMENTS

| | | | |
|---|---|---|---|
| 4,435,792 | 3/1984 | Bechtolsheim | 365/230 |
| 4,945,495 | 7/1990 | Ueda | 364/518 |
| 5,548,709 | 8/1996 | Hannah et al. | 395/164 |
| 5,572,636 | 11/1996 | Sakuraba et al. | 395/130 |
| 5,586,234 | 12/1996 | Sakuraba et al. | 395/130 |
| 5,596,687 | 1/1997 | Peters, Jr. et al. | 395/130 |
| 5,606,650 | 2/1997 | Kelley et al. | 345/430 |

FOREIGN PATENT DOCUMENTS 6309471 11/1994 Japan .
2267203 11/1993 United Kingdom .

OTHER PUBLICATIONS

Dudgeon et al., "Algorithm For Graphics Texture Mapping," System Theory, 1991 Southeastern Symposium, Jan. 1991, pp. 613–617.

Dunnett et al., "The Image Chip for High Performance 3D Rendering," IEEE Computer Graphics and Applications Magazine, vol. 12, No. 6, Nov. 1992, pp. 41–52.

Demirer et al., "Texture Mapping using Clustering Techniques," Mediterranean Electrotechnical Conference, Jan. 1994, pp. 355–358.

Blinn, "The Truth About Texture Mapping," IEEE Computer Graphics and Applications Magazine, vol. 10, No. 2, Mar. 1990, pp. 78–83.

"Shared Texture Map Memory In A Multi–Rasterizer System", *IBM Technical Disclosure Bulletin;* vol. 37, No. 06A Jun. 1994; pp. 269–275.

*Primary Examiner*—Mark K. Zimmerman

[57] ABSTRACT

This texture pattern memory circuit is composed of a multi-texture pattern memory, a writing device and a texel selector. The multi-texture pattern memory includes an adder, a subtracter, selectors, 1st to 4th address converting devices, and 1st to 4th memory modules. The texel selector selects only the necessary data from the texel data outputted from the multi-texture pattern memory.

23 Claims, 23 Drawing Sheets

FIG. 11

| ADDRESS | 1st MEMORY | 2nd MEMORY | 3rd MEMORY | 4th MEMORY |
|---|---|---|---|---|
| 000H | (0, 0) | (1, 0) | (2, 0) | (3, 0) |
| 001H | (4, 0) | (5, 0) | (6, 0) | (7, 0) |
| 002H | (8, 0) | (9, 0) | (10, 0) | (11, 0) |
| 003H | (12, 0) | (13, 0) | (14, 0) | (15, 0) |
| ⋮ | | | | |
| 03FH | (252, 0) | (253, 0) | (254, 0) | (255, 0) |
| 040H | (0, 1) | (1, 1) | (2, 1) | (3, 1) |
| 041H | (4, 1) | (5, 1) | (6, 1) | (7, 1) |
| ⋮ | ⋮ | ⋮ | ⋮ | ⋮ |

$\dfrac{Smax}{4}$

IN A CASE OF Smax = 256

FIG. 15

1st TEXTURE PATTERN MEMORY CIRCUIT

| ADDRESS | 1st MEMORY | 2nd MEMORY | 3rd MEMORY | 4th MEMORY |
|---|---|---|---|---|
| 000H | (0, 0) | (1, 0) | (2, 0) | (3, 0) |
| 001H | (4, 0) | (5, 0) | (6, 0) | (7, 0) |
| 002H | (8, 0) | (9, 0) | (10, 0) | (11, 0) |
| 003H | (12, 0) | (13, 0) | (14, 0) | (15, 0) |
| ⋮ | | | | |
| 03FH | (252, 0) | (253, 0) | (254, 0) | (255, 0) |
| 040H | (0, 4) | (1, 4) | (2, 4) | (3, 4) |
| 041H | (4, 4) | (5, 4) | (6, 4) | (7, 4) |
| ⋮ | | | | |

Right bracket from 000H to 03FH: $\dfrac{Smax}{4}$

IN A CASE OF Smax = 256

FIG. 16

2nd TEXTURE PATTERN MEMORY CIRCUIT

| ADDRESS | 1st MEMORY | 2nd MEMORY | 3rd MEMORY | 4th MEMORY |
|---|---|---|---|---|
| 000H | (0, 1) | (1, 1) | (2, 1) | (3, 1) |
| 001H | (4, 1) | (5, 1) | (6, 1) | (7, 1) |
| 002H | (8, 1) | (9, 1) | (10, 1) | (11, 1) |
| 003H | (12, 1) | (13, 1) | (14, 1) | (15, 1) |
| ⋮ | | | | |
| 03FH | (252, 1) | (253, 1) | (254, 1) | (255, 1) |
| 040H | (0, 5) | (1, 5) | (2, 5) | (3, 5) |
| 041H | (4, 5) | (5, 5) | (6, 5) | (7, 5) |
| ⋮ | | | | |

Right bracket from 000H to 03FH: $\dfrac{Smax}{4}$

IN A CASE OF Smax = 256

FIG. 17

3rd TEXTURE PATTERN MEMORY CIRCUIT

| ADDRESS | 1st MEMORY | 2nd MEMORY | 3rd MEMORY | 4th MEMORY | |
|---|---|---|---|---|---|
| 000H | (0, 2) | (1, 2) | (2, 2) | (3, 2) | |
| 001H | (4, 2) | (5, 2) | (6, 2) | (7, 2) | |
| 002H | (8, 2) | (9, 2) | (10, 2) | (11, 2) | $\frac{Smax}{4}$ |
| 003H | (12, 2) | (13, 2) | (14, 2) | (15, 2) | |
| ⋮ | | | | | |
| 03FH | (252, 2) | (253, 2) | (254, 2) | (255, 2) | |
| 040H | (0, 6) | (1, 6) | (2, 6) | (3, 6) | |
| 041H | (4, 6) | (5, 6) | (6, 6) | (7, 6) | |
| ⋮ | ⋮ | ⋮ | ⋮ | ⋮ | |

IN A CASE OF Smax = 256

FIG. 18

4th TEXTURE PATTERN MEMORY CIRCUIT

| ADDRESS | 1st MEMORY | 2nd MEMORY | 3rd MEMORY | 4th MEMORY | |
|---|---|---|---|---|---|
| 000H | (0, 3) | (1, 3) | (2, 3) | (3, 3) | |
| 001H | (4, 3) | (5, 3) | (6, 3) | (7, 3) | |
| 002H | (8, 3) | (9, 3) | (10, 3) | (11, 3) | $\frac{Smax}{4}$ |
| 003H | (12, 3) | (13, 3) | (14, 3) | (15, 3) | |
| ⋮ | | | | | |
| 03FH | (252, 3) | (253, 3) | (254, 3) | (255, 3) | |
| 040H | (0, 7) | (1, 7) | (2, 7) | (3, 7) | |
| 041H | (4, 7) | (5, 7) | (6, 7) | (7, 7) | |
| ⋮ | ⋮ | ⋮ | ⋮ | ⋮ | |

IN A CASE OF Smax = 256

FIG.22

1st TEXTURE PATTERN MEMORY

| ADDRESS | MEMORY BIT WIDTH b | MEMORY BIT WIDTH 2b | | MEMORY BIT WIDTH b |
|---|---|---|---|---|
| 000H | (0, 0) | (1, 0) | (2, 0) | (3, 0) |
| 001H | (4, 0) | (5, 0) | (6, 0) | (7, 0) |
| 002H | (8, 0) | (9, 0) | (10, 0) | (11, 0) |
| 003H | (12, 0) | (13, 0) | (14, 0) | (15, 0) |
| ⋮ | | | | |
| 03FH | (252, 0) | (253, 0) | (254, 0) | (255, 0) |
| 040H | (0, 4) | (1, 4) | (2, 4) | (3, 4) |
| 041H | (4, 4) | (5, 4) | (6, 4) | (7, 4) |
| ⋮ | ⋮ | ⋮ | ⋮ | ⋮ |

$\dfrac{Smax}{4}$ (spanning rows 000H–03FH)

FIG.23

2nd TEXTURE PATTERN MEMORY

| ADDRESS | MEMORY BIT WIDTH 2b | | MEMORY BIT WIDTH 4b | | | | MEMORY BIT WIDTH 2b | |
|---|---|---|---|---|---|---|---|---|
| 000H | (0, 1) | (0, 2) | (1, 1) | (1, 2) | (2, 1) | (2, 2) | (3, 1) | (3, 2) |
| 001H | (4, 1) | (4, 2) | (5, 1) | (5, 2) | (6, 1) | (6, 2) | (7, 1) | (7, 2) |
| 002H | (8, 1) | (8, 2) | (9, 1) | (9, 2) | (10, 1) | (10, 2) | (11, 1) | (11, 2) |
| 003H | (12, 1) | (12, 2) | (13, 1) | (13, 2) | (14, 1) | (14, 2) | (15, 1) | (15, 2) |
| ⋮ | | | | | | | | |
| 03FH | (252, 1) | (252, 2) | (253, 1) | (253, 2) | (254, 1) | (254, 2) | (255, 1) | (255, 2) |
| 040H | (0, 5) | (0, 6) | (1, 5) | (1, 6) | (2, 5) | (2, 6) | (3, 5) | (3, 6) |
| 041H | (4, 5) | (4, 6) | (5, 5) | (5, 6) | (6, 5) | (6, 6) | (7, 5) | (7, 6) |
| ⋮ | ⋮ | ⋮ | ⋮ | ⋮ | ⋮ | ⋮ | ⋮ | ⋮ |

TEXTURE PATTERN MEMORY CIRCUIT FOR PROVIDING PLURAL TEXEL DATA IN RESPONSE TO A SINGLE ACCESS OPERATION

BACKGROUND OF THE INVENTION

1. Field of the Invention

The present invention relates to a texture pattern memory circuit for use in texture mapping.

2. Description of the Related Art

Texture mapping is used as one of typical methods of creating richness of texture in three-dimensional computer graphics. Texture mapping is a technique which represents texture of an article by applying (or mapping) a separately defined texture pattern such as a grainy pattern or marble pattern onto a surface of a three-dimensional shape in order to create richness of texture of the article.

There are several techniques to map a two-dimensional image on a three-dimensional shape. One of the techniques is a 'UV mapping'. Referring now to FIG. 1, an example of the UV mapping will be described.

First, suppose that a figure surface onto which a pattern is mapped is represented by a coordinate system specified by U and V (to be referred to hereinafter as UV-coordinate system). It is also assumed that two-dimensional coordinate systems for a texture pattern and a display are designated by ST- and XY-coordinate systems respectively.

The color and brightness of a point (U,V) on the 3-dimensional figure surface displayed on the display coordinate system (X,Y) is determined by effecting calculative (filtering) operation as to the color and brightness at a corresponding point (S,T) and in its peripheral area on the texture pattern coordinate system. When the geometric feature of a figure to be mapped is not very complicated, the relationship between (U,V) and (S,T) is determined by specifying the positions of apexes of polygons with proper U-, V-values or S-, T-values and calculating the inside values of the polygons using linear interpolation. At the time of the texture mapping, the transformation of the coordinate systems is performed in the order of (X,Y)→(U,V)→(S,T).

Examples of texture patterns include photographs and pictures inputted using an image scanner as well as those patterns generated by programs.

In practice, as shown in FIG. 2, a texture pattern memory 51 that stores a texture pattern determined by the aforementioned method is mapped onto a frame memory 53 that stores data to be displayed on a display, by filtering the texture pattern to produce a drawing pattern in the form of a vector drawing onto the frame memory 53. The drawing onto the frame memory 53 is performed based on the XY-coordinate system and data is read from the texture pattern memory 51 by calculating the ST-coordinate system using linear interpolation.

Specifically, a drawing controller 54 instructs the texture pattern memory 51 to read out information at a memory location specified by coordinates (S,T) and instructs the frame memory 53 to write the information into a memory location specified by coordinates (X,Y). In response to the instructions, the color and brightness at the coordinate point (S,T) and in its peripheral area is read out and filtered through a writing data calculating unit 52. The filtered result is written onto the frame memory 53. The content in the frame memory 53 is displayed on a display 55.

In the filtering process, the data from the texture pattern memory is shaped so that the texture to be displayed on the display may appear as a continuous texture pattern. If color or brightness is determined merely based on the data at individual coordinate points (S,T) without effecting the filtering process, the resultant picture applied in the form of a 3-dimensional figure turns out to be a sporadic or jagged image.

There are several schemes for such filtering. A typical method is that the average values of the color and brightness around a coordinate point (S,T) are used for displaying. Consider this method with reference to FIG. 3. Hereinbelow, it is assumed that a pixel represents a single dot in a display pattern stored in the frame memory and a texel represents a single dot in a texture pattern stored in the texture pattern memory.

As shown in FIG. 3, the color or brightness to be applied to a pixel should be represented by the average value of color or brightness of the hatching centered by the coordinate point (S,T). The size of the hatching is a projected size of an XY-coordinate pixel on the texture pattern and is determined by the transformation of (X,Y)→(U,V)→(S,T). Therefore, the size may differ depending on the tilt or size of the surface of the 3-dimensional figure to which the pixel is applied. The coordinate point (S,T) is not necessarily positioned at the center of a pixel. It is hardly possible for the coordinates which are determined by the transformation, to be integer values.

The writing data calculating unit 52 of a simple kind selects four texels near a point (S,T) shown in the figure and divides the sum of the brightness values by four to produce an output. In a practical circuit, it is hardly possible to select the nearest four texels to the point (S,T) in response to the readout instructions of the coordinate point (S,T). Therefore, texel data on all the nine texels shown, or all the texel data around the integer pair (S,T) which is produced by rounding the original (S,T) to integer values is adapted to be outputted to the writing data calculating unit 52. In the following description, (S,T) will always designate the integer pair thus rounded to integers.

Examples of the methods of reading out a plurality of texel data from the texture pattern memory are as follows:

(1) Multi-Accessing Scheme

FIG. 4 is a block diagram showing a texture pattern memory for effecting the method. In this circuit, a counter 56 counts the clock signal. An offset output circuit 57 outputs offset data by sequentially changing its value with reference to the counting value from the counter 56. The offset data outputted is added to the coordinates (S,T) in an adder 58 and the resultant is outputted to an address converting device 59. The address converting device 59 calculates addresses to be accessed in a texture pattern memory 60. In this way, the designated address is successively varied so as to enable a multiple number of accesses in the texture pattern memory 60 to load a plurality of texel data from the memory.

This method, however, must effect a great number of accesses to the memory, thus needing a longer time. For example, in order to obtain nine texel data, nine accesses to the memory are required.

(2) Multi-Memory Scheme

FIG. 5 is a block diagram showing a texture pattern memory for effecting the method. As shown in the figure, this method requires a plurality of texture pattern memories in which an identical texture pattern is stored in properly shifted memory locations as to the (S,T) system. By this configuration, designation of a single address allows a plurality of accesses to the texture pattern memory modules, whereby texel data at the multiple number of coordinate points can be obtained at the same time.

This technique, however, has to store a plural number of texture patterns having the same content and requires bulky memory, resulting in increased cost. For example, in order to obtain nine texel data, nine memory devices are needed.

(3) Multi-Accessing and Multi-Memory Scheme

FIG. 6 is a block diagram showing a texture pattern memory for effecting the method. This technique is a combination of the configurations shown in FIGS. 4 and 5 and the blocks designated by the same reference numerals have the same functions. This configuration makes it possible to reduce the number of times of accesses to the memory as well as the size of memory. For example, to obtain nine texel data requires three memory modules and three accesses to the memory.

This technique, however, merely offers intermediate effects between the multi-accessing technique and the multi-memory technique. That is, the number of memory modules required is increased as compared to the multi-accessing technique whereas the number of times of accesses to the memory is increased as compared to the multi-memory technique.

SUMMARY OF THE INVENTION

The present invention has been achieved to solve the above problems and it is therefore an object of the invention to provide a texture pattern memory circuit which allows a single access to obtain a plurality of texels and which is therefore improved in memory efficiency and enables fast access thereto.

The gist of the invention to achieve the above object will be described hereinbelow.

In accordance with a first feature the invention, a texture pattern memory circuit for storing a plurality of data as to texels each of which represents a single dot in a texture pattern and outputting only a number of texel data required for texture mapping, includes:

a storing device including a memory circuit for storing texel data by setting up an identical address for each group of texel coordinate points in series and outputting, when a texel coordinate point is inputted to read out texel data, a plurality of texel data for a group of texel coordinate points in series based on the address specified by the input texel coordinate point, wherein when one of the adjoining texel coordinate points, arrayed sequentially in the coordinate order, to the input texel coordinate point has a different address from that of the input texel coordinate point, part of the texel coordinate points having the same address with that of the input texel coordinate point is replaced so that the input texel coordinate point may occupy a substantially central position in the group of the texel coordinate points in series to be read out;

a writing device for writing texel data as to texel coordinate points into the memory circuit at respective addresses set up in conformity with the texel coordinate points so that texel data for each group of texel coordinate points are arranged sequentially at memory locations with the same address in the memory circuit; and a reading/selecting device for reading texel data in accordance with an address specified in the storing device when a texel coordinate point is inputted and selecting texel data required.

In accordance with a second feature the invention, in a texture pattern memory circuit of the first configuration of the invention a storing device comprises:

an adder for adding the number of texel coordinate points in series having the same address to the input texel coordinate value;

a subtracter for subtracting the number of texel coordinate points in series having the same address from the input texel coordinate value;

a first selector for selecting the output from the adder when the texel coordinate point following the input texel coordinate point has another address and selecting the input texel coordinate value in the cases other than the above condition;

a second selector for selecting the output from the subtracter when the texel coordinate point prior to the input texel coordinate point has another address and selecting the input texel coordinate value in the cases other than the above condition;

address converting devices for calculating addresses based on the texel coordinate point determined by the output from the first selector, the texel coordinate point determined by the output from the second selector and the original texel coordinate point, respectively; and memory modules for storing texel data for texel coordinate points sequentially into memory locations with addresses specified by the address converting devices.

In accordance with a third feature of the invention, in a texture pattern memory circuit of the second configuration of the invention, the address converting devices and the memory modules are provided as many as the number of texel coordinate points in series having the same address set up so that addresses in the memory modules are designated by the address converting devices.

In accordance with a fourth feature of the invention, in a texture pattern memory circuit of the second configuration of the invention, the adder with first selector and the subtracter with second selector are logically built in respective address converting devices.

In accordance with a fifth feature of the invention, in a texture pattern memory circuit of the second configuration of the invention, the address converting devices are sectioned into a plurality of parts for calculating addresses based on the texel coordinate point determined by the output from the first selector, the texel coordinate point determined by the output from the second selector and the original texel coordinate point, respectively, and each part is formed of an integrated structure.

In accordance with a sixth feature of the invention, in a texture pattern memory circuit of the second configuration of the invention, the memory of a plurality of modules whose address is designated based on the texel coordinate point determined by the output from the first selector, the texel coordinate point determined by the output from the second selector or the original texel coordinate point, each part is formed of an integrated structure.

In accordance with a seventh feature of the invention, in a texture pattern memory circuit of the second configuration of the invention, the reading/selecting device includes: selectors which each are supplied with all the data read out in parallel from the memory modules and each select one data output required based on the input texel coordinates from the supplied data and the selectors are provided as many as the number of texel data required for texture mapping and output respective, selected data in parallel.

In accordance with an eighth feature of the invention, in a texture pattern memory circuit of the second configuration of the invention, the reading/selecting device selects a required set of texel data from a plurality of texel data stored in the memory modules based on the input texel coordinates and selectively outputs the selected data onto a bus in response to the input of a texel select signal.

In accordance with a ninth feature of the invention, in a texture pattern memory circuit of the second configuration of the invention, the reading/selecting device comprises:

a gate signal generating device for generating a gate signal based on the input texel coordinates and an input texel select signal; and a plurality of texel data selecting gates each selecting a single texel data output from the plural texel data and sending the output onto a bus for transmitting data with one texel data width.

In accordance with a tenth feature of the invention, in a texture pattern memory circuit of the second configuration of the invention, each of the memory modules has an input terminal for enabling/disabling the data output, the reading/selecting device has a gate signal generating device for generating gate signals based on the input texel coordinates and the input texel select signal, and the gate signal is supplied to the input terminal of each memory module to thereby selectively output required texel data onto the bus with one texel data width.

In accordance with an eleventh feature of the invention, in a texture pattern memory circuit of the second configuration of the invention, the writing device comprises:

a write selector for selecting one of memory modules to be written in with reference to the input texel coordinates and transmitting a writing signal; and a write data gate for allowing data to be supplied to the memory modules during only a write operation.

In accordance with a twelfth feature of the invention, in a texture pattern memory circuit of the second configuration of the invention, the memory module comprises a texture pattern memory circuit defined in the eleventh configuration.

In accordance with a thirteenth feature of the invention, in a texture pattern memory circuit of the second configuration of the invention, the writing device comprises:

a write selector for selecting one of memory modules with reference to the input texel coordinates and transmitting a writing signal; and a write data gate for allowing texel data for texel coordinates to be outputted to the memory modules during only a write operation.

In accordance with a fourteenth feature of the invention, in a texture pattern memory circuit of the thirteenth configuration of the invention, each of the memory modules is replaced by the texture pattern memory circuits of the texture pattern memory circuit of the twelfth configuration to form a recursive structure.

In accordance with a fifteenth feature of the invention, in a texture pattern memory circuit of the thirteenth or fourteenth configuration, a plurality of writing devices as well as a plurality of reading devices are integrated into a united structure to have the common functions.

In accordance with the invention described above, the texture pattern memory circuit includes address converting devices for calculating specified addresses based on the output from the first selector which selects either of the texel coordinates or the output from the adder as well as based on the output from the second selector which selects either of the texel coordinates or the output from the subtracter. There exist a plurality of memory modules in correspondence with corresponding address converting devices which each designate the memory location in the memory module. The address converting devices, which based on the input texel coordinates, will set up the same address for all the memory modules. Basically, if the memory modules with the same address are made to sequentially contain texel data for the input texel coordinate point and its peripheral coordinate points, which all are required to calculate data on a pixel to be written into the frame memory, it is possible to read out these data at a single access.

However, all texel coordinate points will not have necessary coordinate points within the group having the same address. This is why the adder and subtracter are used. That is, if all the required texel data exists within the locations with the same address, the texel coordinates are supplied unchanged to the address converting devices. If some of the required texel data are not contained within the locations with the same address, the number of texel coordinate points set up to have the same address is added to or subtracted from the input texel coordinate data in the adder or subtracter and the resultant coordinate data is outputted to one of the address converting devices. The resultant coordinate data will designate an address at which a required texel data is stored. Thus, this texture pattern memory circuit is able to produce a plurality of texel data outputs containing all the necessary texel data.

In the above way, all the texel data for an input coordinate point (S,T) and its peripheral points, required for the calculation of writing pixel data from the memory modules to the frame memory, can be outputted. Accordingly, it is possible to attain high-speed access. Further, since there is no necessity to store duplicated texel data in the memory, it is possible to achieve markedly improved memory efficiency.

The configuration in the fourth, fifth or sixth features of the invention, reduces the numbers of the adders, subtracters, address converting devices and memory devices to make the circuit compact, so that it is possible to downsize the circuit as well as to improve the assembly performance of the circuit, resulting in reduced cost.

In the seventh feature of the invention, since the reading/selecting device is adapted to simultaneously output the texel data for the input texel coordinate point and its peripheral coordinate points, all required for the calculation of the pixel data, it is possible to speed up the data output operation.

In the eighth, ninth and tenth features of the invention, the reading/selecting device, based on the texel select signal, determines which texel data is to be outputted onto the texel data bus. In other words, instead of outputting all the texel data at the same time, a certain quantity of texel data is adapted to be transmitted successively. This configuration which allows a mass of data to be interchanged at high speed, is able to keep small the bit width of the signal on the texel data bus, whereby it is possible to inhibit generation of noises due to crosstalk between the signals, additional capacitance or the like.

In the eleventh feature of the invention, since the texel data for the input texel coordinate point and its peripheral coordinate points, all required for the calculation of texture mapping is outputted at the same time, it is possible to write the texel data sequentially into the memory modules having the same address. Since the texel selector which is able to select only the necessary texel data from the texel data outputted from the texture pattern memory, is provided, this configuration allows high-speed access and is able to attain markedly improved memory efficiency.

In the twelfth feature of the invention, since the memory modules use the texture pattern memory circuits of the eleventh configuration of the invention, an increased number of texel data can be obtained at a single access, whereby it is possible to obtain a mass of texel data at a time.

Since the thirteenth feature of the invention includes the memory modules composed of the texture pattern memory circuits of the eleventh configuration and the reading/selecting device, it is possible to select necessary data from a further increased number of texel data.

Since the fourteenth feature of the invention is constructed such that the memory modules constituting the eleventh configuration of the invention, are replaced with the texture pattern memory circuits having the twelfth configuration, a markedly large number of texel data can be obtained at a single access thus making it possible to attain high-speed access as well as highly improved memory efficiency.

In the fifteenth feature of the invention, the reading/selecting devices and writing devices in the multi-fold configuration of the thirteenth and fourteenth features can be integrated into united structures, it is possible to reduce the scale of the circuit.

BRIEF DESCRIPTION OF THE DRAWINGS

FIG. 11 is an illustrative view showing a relationship between addresses in memory modules in a multi-texture pattern memory and coordinates (S,T) in a first embodiment;

FIG. 15 is an illustrative view showing a relationship between addresses in memory modules in a 1st multi-texture pattern memory circuit and coordinates (S,T) in a second embodiment;

FIG. 16 is an illustrative view showing a relationship between addresses in memory modules in a 2nd multi-texture pattern memory circuit and coordinates (S,T) in a second embodiment;

FIG. 17 is an illustrative view showing a relationship between addresses in memory modules in a 3rd multi-texture pattern memory circuit and coordinates (S,T) in a second embodiment;

FIG. 18 is an illustrative view showing a relationship between addresses in memory modules in a 4th multi-texture pattern memory circuit and coordinates (S,T) in a second embodiment;

FIG. 22 is an illustrative view showing a relationship between addresses in memory modules in a 1st texture pattern memory circuit used in a multi-texture pattern memory of a third embodiment and coordinates (S,T) in a second embodiment;

FIG. 23 is an illustrative view showing a relationship between addresses in memory modules in a 2nd texture pattern memory circuit used in a multi-texture pattern memory of a third embodiment and coordinates (S,T) in a second embodiment;

DESCRIPTION OF THE PREFERRED EMBODIMENTS

Figure 1:
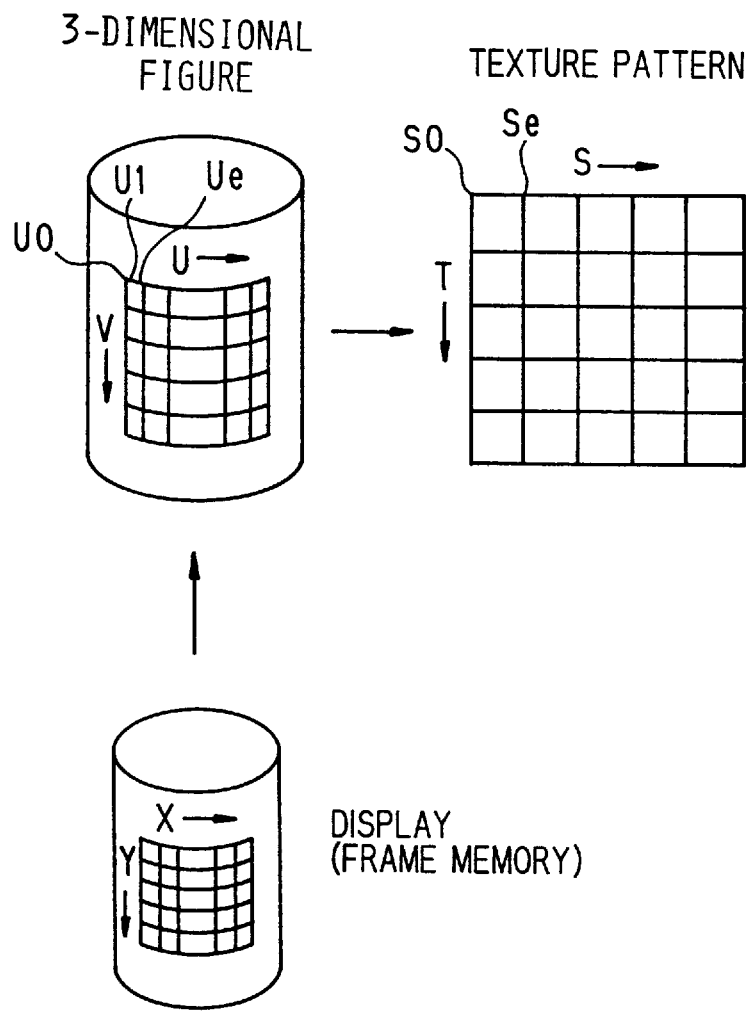
FIG. 1 is an illustration for explaining a conventional method of texture mapping.
Figure 2:
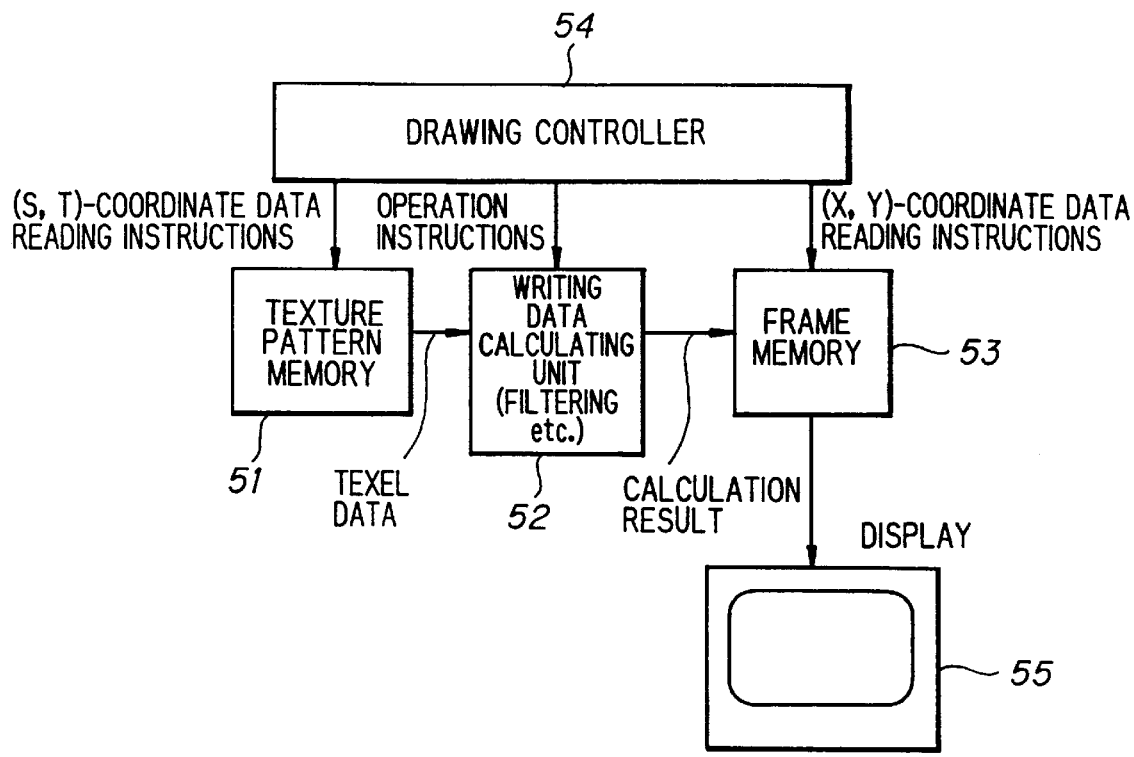
FIG. 2 is a block diagram showing an example of a conventional unit of texture mapping.
Figure 3:
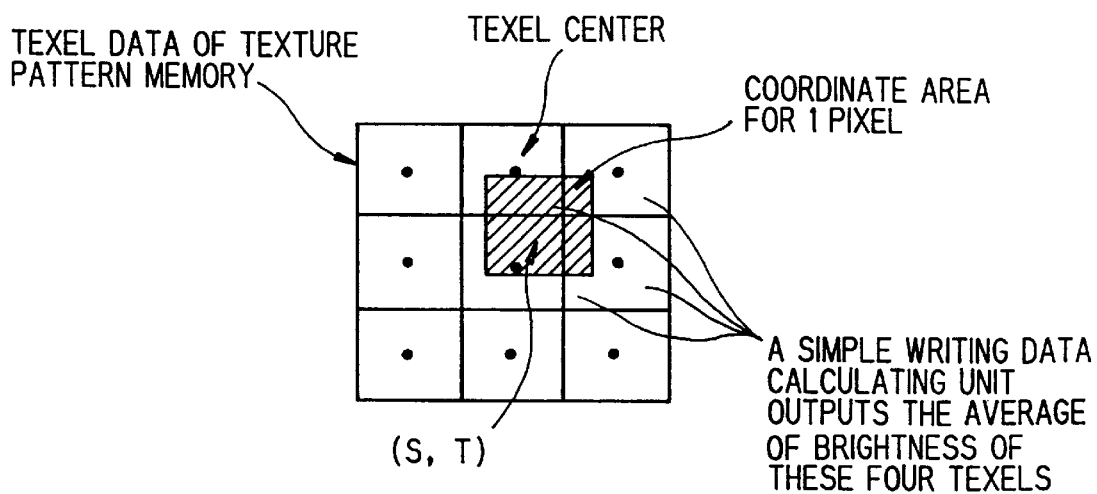
FIG. 3 is an illustrative view showing a read operation of texel data for a write calculation.
Figure 4:
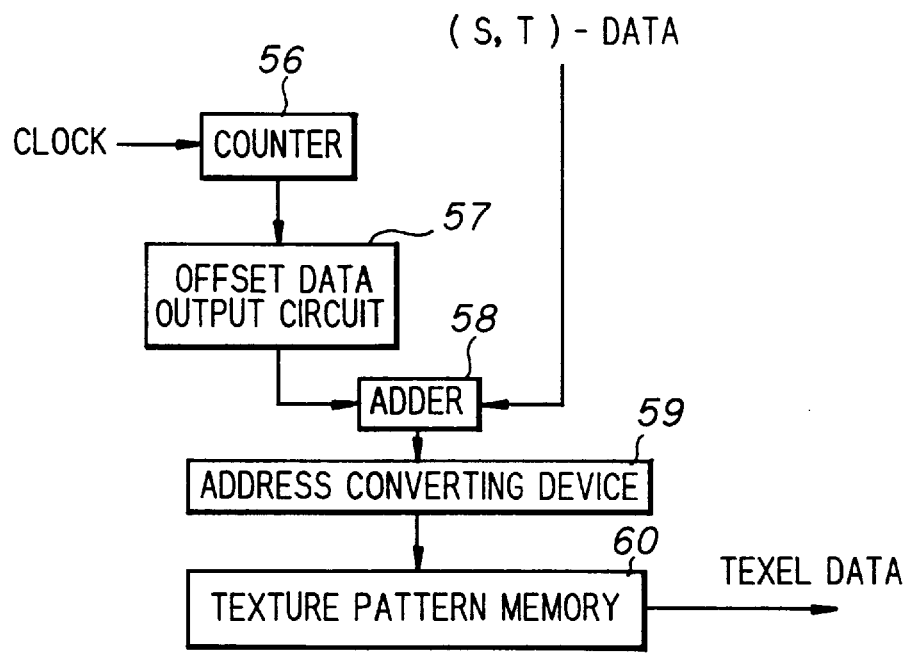
FIG. 4 is a block diagram showing a texture pattern memory circuit used in the multi-accessing scheme.
Figure 5:
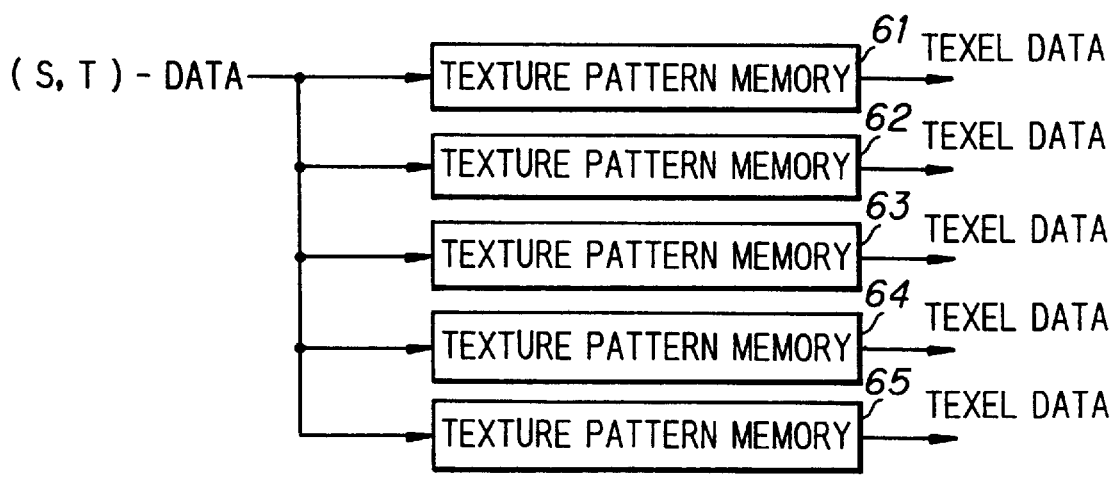
FIG. 5 is a block diagram showing a texture pattern memory circuit used in the multi-memory scheme.
Figure 6:
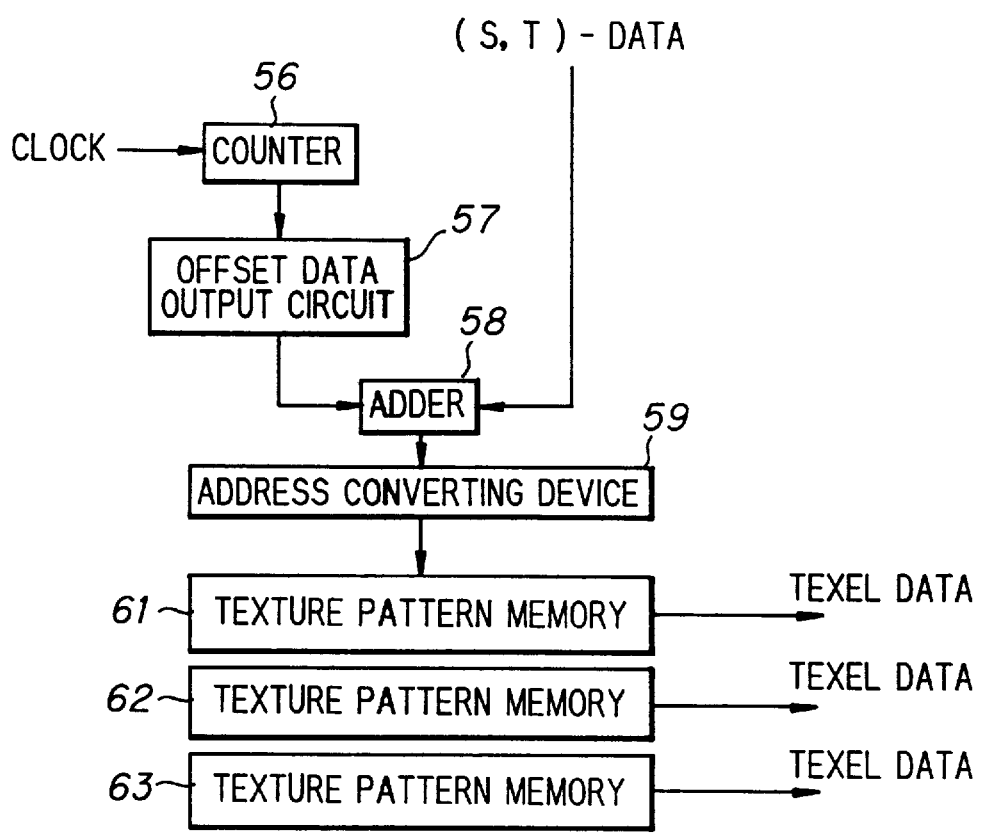
FIG. 6 is a block diagram showing a texture pattern memory circuit used in the multi-accessing and multi-memory scheme.
Figure 7:
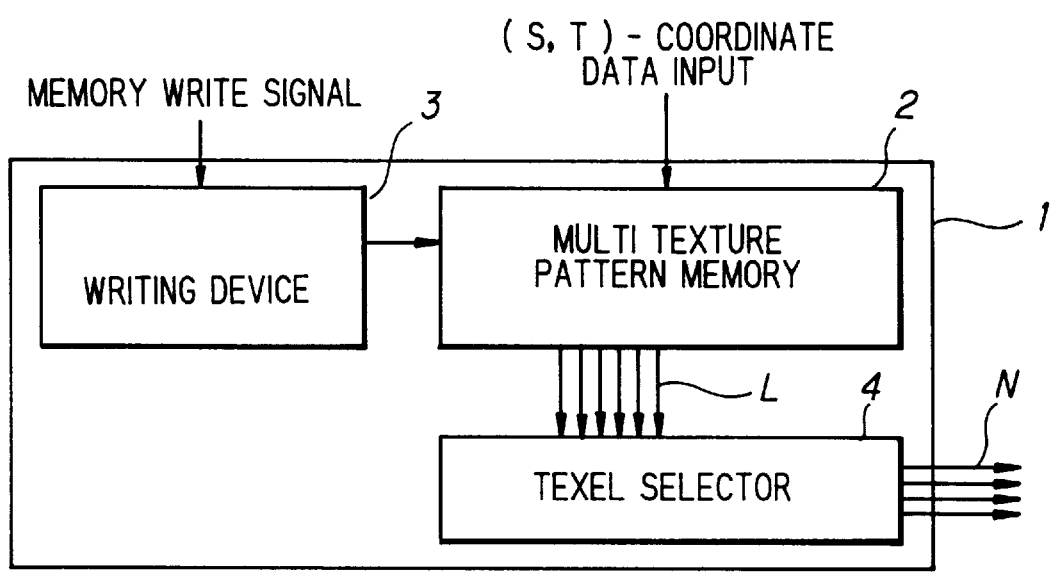
FIG. 7 is a diagram for explaining the principle of a texture pattern memory of the invention.

FIG. 7 is a diagram for explaining the principle of a texture pattern memory of the invention.

A texture pattern memory circuit designated at 1 includes a multi-texture pattern memory 2 as storage for storing texel data by allotting an identical address to a plurality of texel data; a writing device 3 for writing a texture pattern into the texture pattern memory 2; and a texel selector 4 as a reading/selecting device for reading out a plurality of texel data L from the texture pattern memory 2 and selecting texel data N at required coordinate points from the loaded plurality of texel data L.

The multi-texture pattern memory 2 has a function of setting up an identical address for a series of texel coordinate points (S,T). 'A series of texel coordinate points' means a group of coordinate points which is composed of a certain number of elements specified by a fixed S- or T-value and serial integers as the other value. The group of coordinate points may be composed of, for example, four elements such as (1,0), (2,0), (3,0) and (4,0). Another group of coordinate points composed of (5,0), (6,0), (7,0) and (8,0) has another address different from that of the former four elements. Thus, the same address is set up for each series of texel coordinate points. When a texel coordinate point is inputted, texel data for coordinate points having the same address with that of the inputted point are read out. Some of the coordinate points will not have neighboring coordinate points on both sides thereof within the group having the identical address when the coordinates are arrayed in the sequential order. That is, a texel coordinate point adjacent to the input texel coordinate point may have a different address. In such a case, part of the texel coordinate points having the same address with that of the input texel coordinate point is replaced so that the input texel coordinate point may occupy a substantially central position in the group of the texel coordinate points to be read out. For example, if among the group of the coordinate points with texel coordinates (1,0), (2,0), (3,0) and (4,0), a coordinate point (4,0) is inputted, one of the texels adjacent thereto, (5,0) belongs to a different address. In this case, in order for the input texel to be positioned at a substantial center of the group of the texel coordinate points to be read out, the other texel-coordinate points are modified. Specifically, (1,0) is replaced by (5,0) and the address is changed in conformity with the replacement.

The writing device writes texel data as to the texel coordinate points into the multi-texture pattern memory 2 at respective addresses set up for the texel coordinate points so that a plurality of texel data for each series of texel coordinate points are arranged sequentially at memory locations with the same address.

The texel selector 4, when a texel coordinate point is inputted, reads out texel data in accordance with the address specified in the multi-texture pattern memory 2 and selects necessary texel data alone.

This texture pattern memory circuit 1 makes it possible to realize excellent memory efficiency and attain high-speed access performance by allowing a single access to the multi-texture pattern memory 2 to pick up a plurality of texel data L therefrom and causing the texel selector 4 to select necessary texel data N from the picked up plural texel data L. Thus, it becomes possible to obtain the texel data required for the texture mapping operation of the pixels to be written into the frame memory.

First Embodiment

Figure 8:
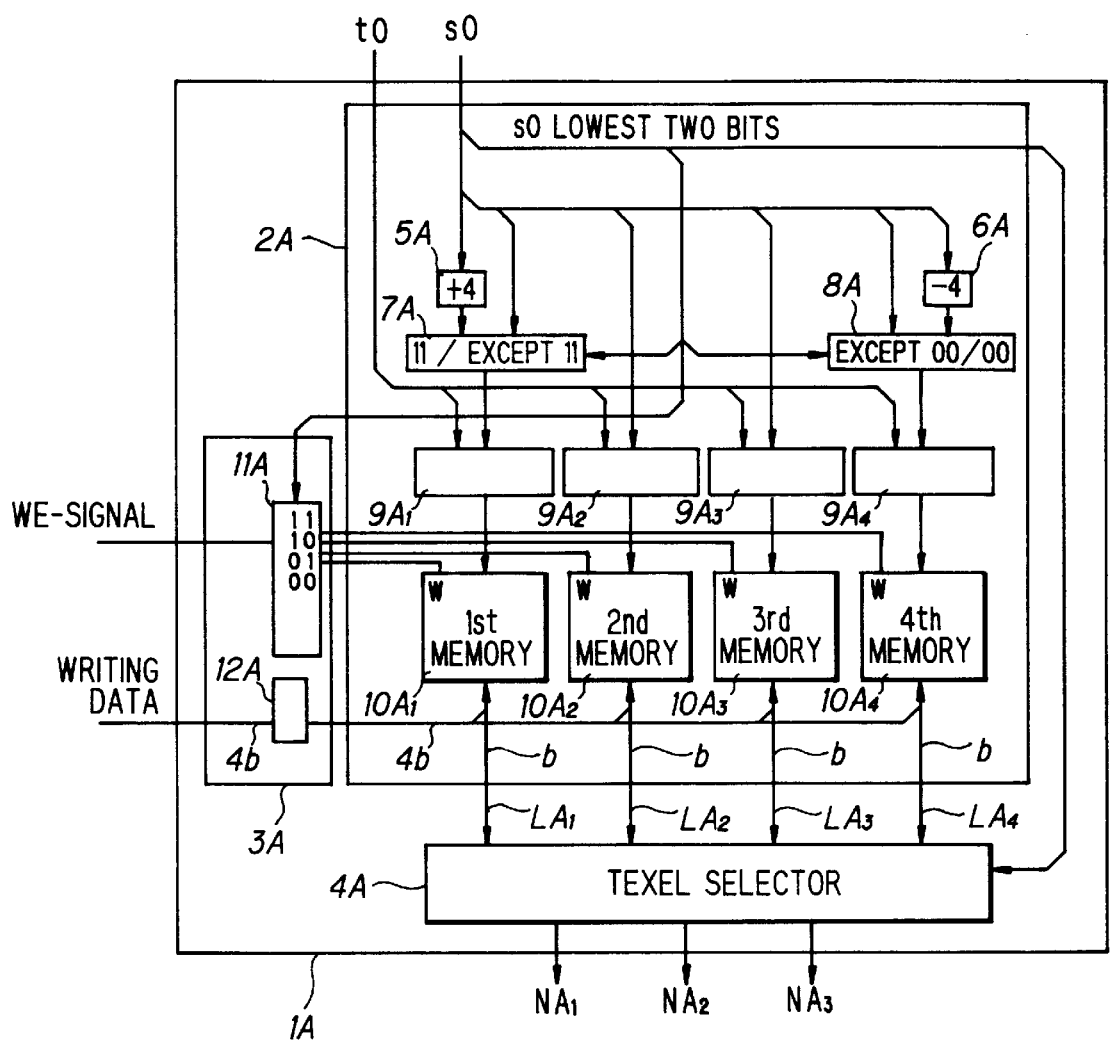
FIG. 8 is a block diagram showing a first embodiment of a texture pattern memory circuit in accordance with the invention.

FIG. 8 is a block diagram showing a first embodiment of a texture pattern memory circuit in accordance with the invention. This texture pattern memory circuit is to provide texel data $NA_1$ to $NA_3$ as to respective coordinate points (S,T), (S-1,T) and (S+1,T) in response to the input of a coordinate point (S,T). Similarly to the configuration shown in FIG. 7, this circuit is composed of a multi-texture pattern memory 2A, a writing device 3A and a texel selector 4A.

The multi-texture pattern memory 2A includes an adder 5A, a subtracter 6A, selectors 7A and 8A, 1st to 4th address converting devices $9A_1$ through $9A_4$, and 1st to 4th memory modules $10A_1$ through $10A_4$.

In this configuration, when, as to a group of coordinate points which are arranged sequentially and have the same address with that of an input texel coordinate point, the input texel coordinate point does not have adjacent texture coordinate points on both sides within the group, the adder 5A and subtracter 6A perform functions of replacing texel coordinate points except the input texel coordinate and changing the address in conformity with the replacement, so that the input texel coordinate point may occupy a substantially central position of the texel coordinate points to be read out. Since texel data for a series of four texel coordinate points are stored sequentially into the memory modules $10A_1$ to $10A_4$, the address converting devices $9A_1$ and $9A_4$ are supplied with modified texel coordinates so as to change the addresses to select the memory locations in the memory module $10A_1$ and $10A_4$.

The address converting devices $9A_1$ through $9A_4$ set up an identical address for each series of four texel coordinate points. Accordingly, if a texel coordinate point (S,T) is inputted, an address value AD will be outputted. This address value AD is represented as the following formula:

$$AD = T \times S_{max} + S_{up}$$

where $S_{max}$ is a maximum value of S (determined depending on the size of the texture plane), $S_{up}$ is a value produced by forcibly replacing the lowest two bits of the input S with 00. The address converting device 9A is a usual circuit therefore the detailed description is omitted. It is also possible to omit the address converting device 9A in some embodiments if the method of producing $S_{max}$ is devised.

The 1st to 4th memory modules $10A_1$ to $10A_4$ are each composed of a semiconductor memory device such as a DRAM or the like. During a write operation, data is written in response to input of the write enable signal while data is outputted if a desired address is specified during a read operation. A plurality of texel data for a series of texel points arranged sequentially are stored in the same address in the separate memory modules $10A_1$ to $10A_4$.

The adder 5A adds 4 to a S-value s0 inputted and the selector 7A selects one of the resultant value or the original s0 to output it to the 1st address converting device $9A_1$. The subtracter 6A subtracts 4 from the S-value s0 and the selector 8A selects one of the resultant value or the original s0 to output it to the 4th address converting devices $9A_4$. An input T-value t0 is supplied as it is to 1st and 4th address converting devices $9A_1$ and $9A_4$. The 2nd and 3rd address converting devices $9A_2$ and $9A_3$ are supplied with the original S-value s0 and T-value t0. The 1st to 4th address converting devices $9A_1$ through $9A_4$ supply the thus determined addresses to respective 1st to 4th memory modules $10A_1$ through $10A_4$.

In this embodiment, the adder and subtracter may be logically built into respective address converting devices $9A_1$ and $9A_4$, together with a built-in selector. This configuration reduces the number of parts and makes the circuit compact, so that it is possible to downsize the circuit as well as to improve the assembly performance of the circuit.

The writing device 3A comprises a write selector 11A and a write data gate 12A. The write selector 11A selects one of the 1st to 4th memory modules $10A_1$ to $10A_4$ with reference to the lowest two bits of S to send a write enable signal WE to the selected module. The write data gate 12A outputs data to be written in to the 1st to 4th memory modules $10A_1$ through $10A_4$ during a write operation.

Figure 9:
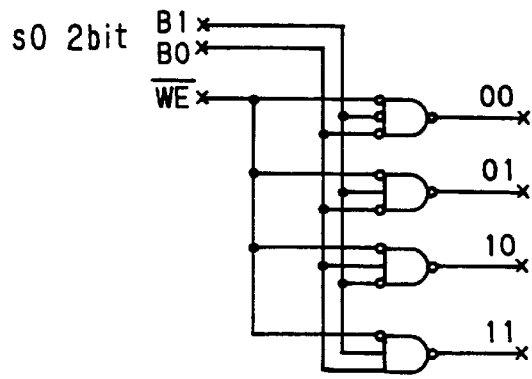
FIG. 9 is a diagram showing a logical circuit of a write selector for writing devices in a first embodiment.

This write selector 11A is formed of, for example, a circuit shown in FIG. 9. This circuit functions to output the write enable signal WE to one of the 1st to 4th memory modules $10A_1$ to $10A_4$ through a corresponding output terminal in response to the status of the lowest two bits of S, 00, 01, 10 or 11. When the write enable signal WE is set at L-level, the memory module is made into the write operation mode. As shown in the figure, the lowest two bits of S are named B0, B1, the circuit has the following configuration. When B0, B1 are 00, the circuitry to output the write enable signal WE to the 1st memory module $10A_1$ is formed of a NAND gate with all the inputs B0, B1 and WE inverted. When B0, B1 are 01, the circuitry to output the write enable signal WE to the 2nd memory module $10A_2$ is formed of a NAND gate with the input B1 non-inverted and the inputs B0 and WE inverted. When B0, B1 are 10, the circuitry to output the write enable signal WE to the 3rd memory module $10A_3$ is formed of a NAND gate with the input B0 non-inverted and the inputs B1 and WE inverted. When B0, B1 are 11, the circuitry to output the write enable signal WE to the 4th memory module $10A_4$ is formed of a NAND gate with the inputs B0 and B1 non-inverted and the input WE inverted.

Figure 10:
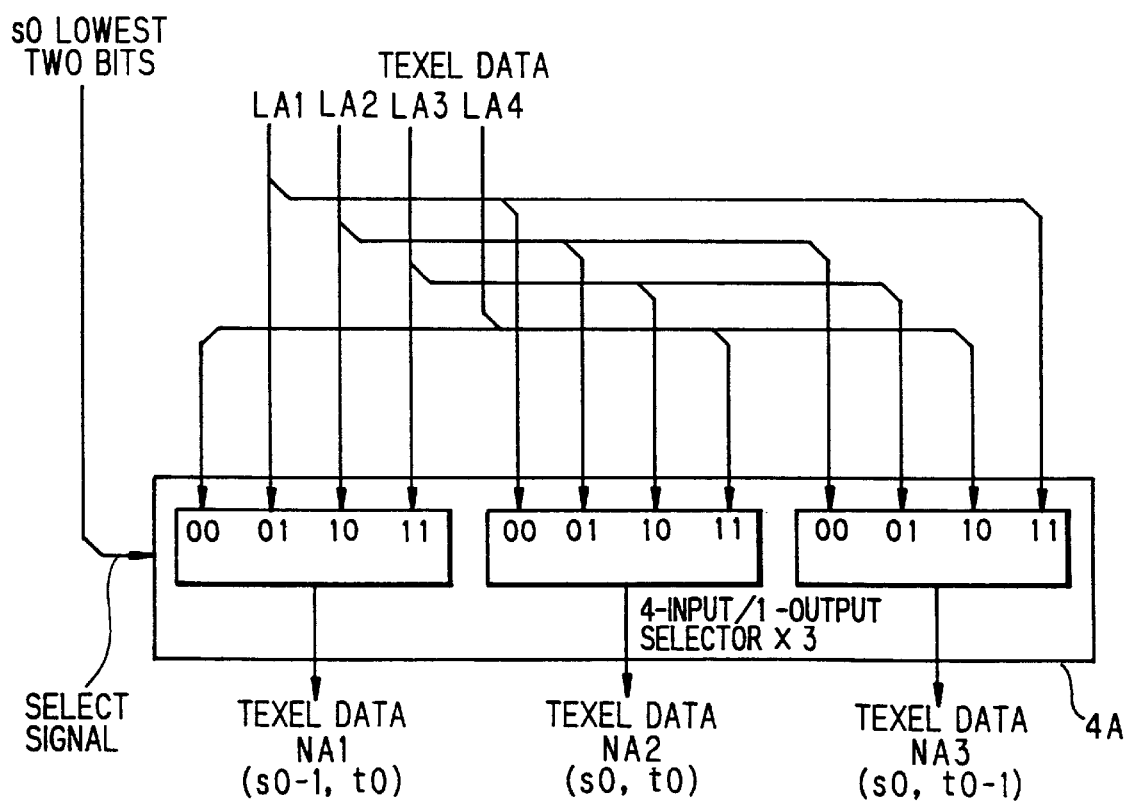
FIG. 10 is a block diagram showing a texel selector of a first embodiment.

The texel selector 4A is formed of three 4-input/1-output selectors as shown in FIG. 10, selects three required data from the four texel data outputted from the 1st to 4th memory modules $10A_1$ through $10A_4$ and uses the selected data to effect calculative operations for producing the pixel data to be written into the frame memory. Each of the three 4-input/1-output selectors are supplied with four texel data $LA_1$ to $LA_4$ outputted from the multi-texture pattern memory 2A. The texel selector 4A is supplied with a select signal of the lowest two bits of s0. Each of the three 4-input/1-output selectors, based on the selector signal, selects one from the four texel data inputted to input terminals 00, 01, 10 and 11. Therefore, the texel data $LA_1$ to $LA_4$ are supplied to respective input terminals of each selector so that the data $NA_1$, $NA_2$ and $NA_3$ for texel coordinate points (s0,t0), (s0−1,t0) and (s0+1,t0) can be selected. Here, 'b' shown in FIG. 8 for the output data $LA_1$ to $LA_4$ from the texture pattern memory 2A indicates the bit width of the texel data.

Now, the operation of the texture pattern memory circuit will be described. First, the operation of writing data on the texture pattern into the 1st to 4th memory modules $10A_1$ to $10A_4$ will be described. Texel coordinates (s0,t0) on the texture pattern are inputted to the texture pattern memory circuit. The write selector 11A of the writing device 3A, based on the lowest two bits of the S-value, outputs the write enable signal WE to select one of the memory modules. Writing addresses in the memory are designated by the address converting devices $9A_1$ to $9A_4$ in the multi-texture pattern memory 2A. The selectors 7A and 8A select the output values from the adder 5A and subtracter 6A when the lowest two bits of the S-value is 11 and 00, respectively. The selected values are address-converted by the address converting devices $9A_1$ and $9A_4$ to be outputted to 1st and 4th memory modules $10A_1$ and $10A_4$, respectively. Other than the above cases, the texel coordinates (s0,t0) are processed as they are and converted into address values by the address converting devices $9A_1$ through $9A_4$. The write selector 11A selects the 1st memory module $10A_1$ when the lowest two bits of the S-value is 00 and the 4th memory module $10A_4$ when the lowest two bits of the S-value is 11. Therefore, when the values from the adder 5A and subtracter 6A are address-converted to be supplied to respective memory modules, those memory modules are not selected. Consequently, during the data write operation, the address assignment for the memory modules $10A_1$ to $10A_4$ is all based on the texel coordinates (s0,t0).

Thus, the write operation into the memory can be performed using the write selector 11A and the write enable signal WE to the memory modules $10A_1$ to $10A_4$. As coordinate values (S,T) are inputted, the memory locations in the memory modules $10A_1$ to $10A_4$ are addressed. At the same time the writing data is inputted through the write data gate 12A to the memory modules $10A_1$ to $10A_4$. In this condition, as any one of the memory locations of the four memory modules addressed is to be assigned to the coordinate point (s0, t0), the write selector 11A may supply the WE signal to select the right memory modules alone. Here, as the write data gate 12A will be kept at the disabled state (with high output impedance) except during the write operation mode, this gate will not affect the result in the read operation mode.

In the write operation, the texel data of texel coordinate points (S,T) are stored in the 1st to 4th memory modules $10A_1$ to $10A_4$ with a fixed T and sequentially increasing S one by one. Each memory module is supplied with the following texel data under the control of the address converting devices $9A_1$ to $9A_4$. That is, the texel data at coordinate points (S,T)=(4n,m) is stored in the 1st memory module $10A_1$; the texel data at coordinate points (S,T)=(4n+1, m) is stored in the 2nd memory module $10A_2$; the texel data at coordinate points (S,T)=(4n+2, m) is stored in the 3rd memory module $10A_3$; and the texel data at coordinate points (S,T)=(4n+3, m) is stored in the 4th memory module $10A_4$. Here, n, and m are integers.

Figure 12:
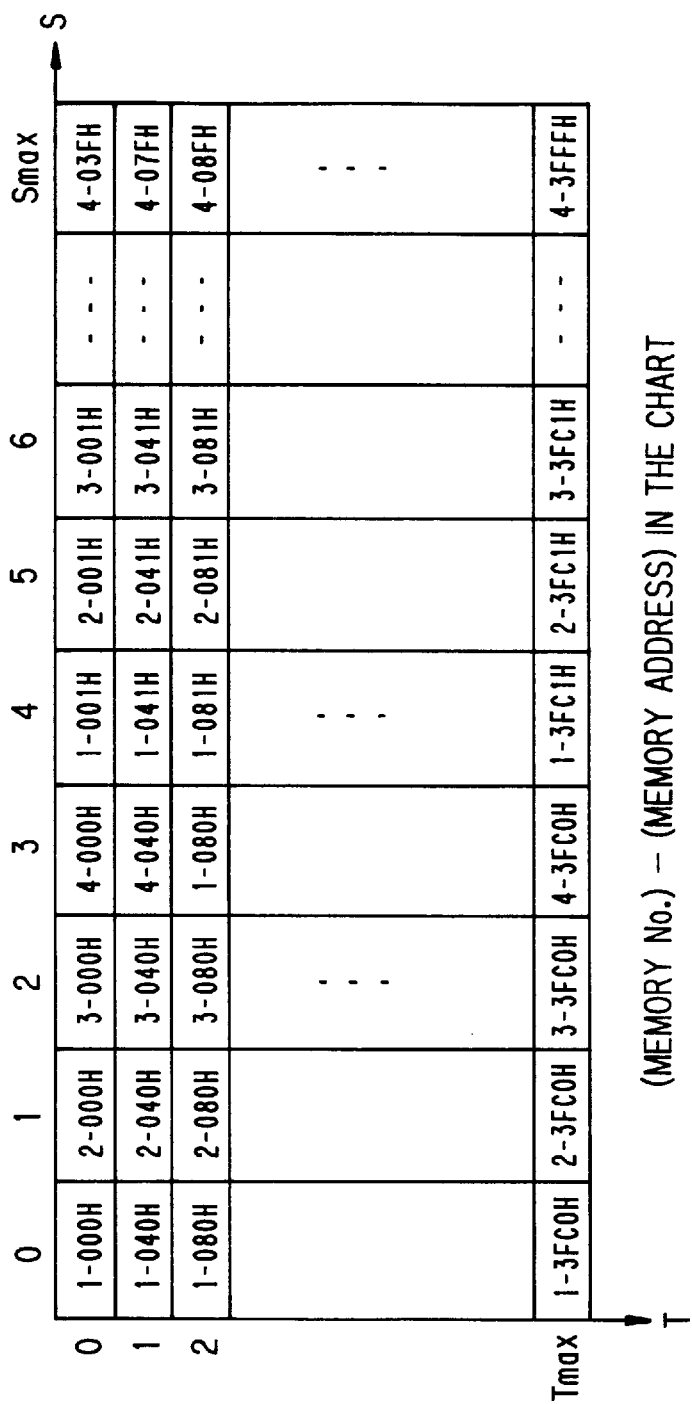
FIG. 12 is an illustrative view showing a relationship between addresses in memory modules in a multi-texture pattern memory and the ST-coordinate plane in a first embodiment.

FIGS. 11 and 12 are charts showing in detail the allocation of the stored texel data. FIG. 11 is a relationship between addresses in the memory modules and the coordinates. This chart shows a case where the maximum (represented by $S_{max}$) of S is 256. Texel data is stored by associating coordinate points (S,T) with memory addresses in the memory modules $10A_1$ to $10A_4$. Specifically, the texel data for coordinate points with a fixed T and serially increasing S from 0 to ($S_{max}$−1) is allocated to the 1st to 4th memory modules $10A_1$ to $10A_4$. Accordingly, upon the allocation of the texture data for a fixed T, the address number of the memory locations in each of the 1st to 4th memory modules $10A_1$ to $10A_4$ is increased up to $S_{max}/4$. For example, if T=0, texel data for (0,0) is stored in the 1st memory module $10A_1$, texel data for (1,0) stored in the 2nd memory module $10A_2$ and so on until texel data for (255,0) is stored in the 4th memory module $10A_4$. When T=1, the data will similarly be stored.

FIG. 12 shows a relationship between the ST-coordinate plane and addresses in the memory modules $10A_1$ to $10A_4$. With S the abscissa and T the ordinate, the addresses in the 1st to 4th memory modules $10A_1$ to $10A_4$ are allotted on the ST-coordinate plane as shown in FIG. 12. Here, the notation in each frame represents (memory module number)—(memory address).

Next, the operation of the texture pattern memory circuit for outputting desired texel data will be described.

Input values (s0, t0) for the ST-coordinate are converted into addresses of the memory modules $10A_1$ to $10A_4$ through the address converting devices $9A_1$ to $9A_4$ so as to designate memory locations in the 1st to 4th memory modules $10A_1$ to $10A_4$. When the lowest two bits of the S-value s0 are 11, the adder 5A adds 4 to the S-value s0 and the resultant coordinate is converted into an address to be inputted to the 1st memory module $10A_1$. When the lowest two bits of the S-value s0 are 00, the subtracter 6A subtracts 4 from the S-value s0 and the resultant coordinate is converted into an address that designates a memory location in the 4th memory module $10A_4$. The above selections are made by the selectors 7A and 8A.

Other than the above cases where the lowest two bits of the S-value s0 are 00 or 11, the same address number will be set up for all the 1st to 4th memory modules $10A_1$ to $10A_4$ based on the input values (s0, t0) for the ST-coordinate. As shown in FIG. 11, since the memory locations with the same address number in the 1st to 4th memory modules $10A_1$ to $10A_4$ are allotted with coordinates (S, T) whose S-value increases one by one from the left to the right and since the manipulative operation is devised if the input coordinate point (s0, t0) is located in 1st or 4th memory modules, the output texel data $LA_1$ to $LA_4$ from the four memory modules $10A_1$ to $10A_4$ in the memory texture pattern memory 2A necessarily contain texel data for (s0−1, t0), (s0, t0) and (s0+1, t0).

For example, when (S, T)=(12, 5), the output texel data $LA_1$ to $LA_4$ from the memory modules $10A_1$ to $10A_4$ are:
1st memory module: texel data for (S, T)=(12, 5)
2nd memory module: texel data for (S, T)=(13, 5)
3rd memory module: texel data for (S, T)=(14, 5)
4th memory module: texel data for (S, T)=(11, 5).
That is, (s0−1, t0)=(11, 5), (s0, t0)=(12, 5) and (s0+1, t0)=(13, 5) are involved. Here, the reason the value in the 4th memory module is discontinuous is that the address for the 4th memory module is produced through the subtracter 6A since the lowest two bits of S are 00.

As another example, when (S, T)=(13, 5), the output texel data are:
1st memory module: texel data for (S, T)=(12, 5)
2nd memory module: texel data for (S, T)=(13, 5)
3rd memory module: texel data for (S, T)=(14, 5)
4th memory module: texel data for (S, T)=(15, 5).

As a further example, when (S, T)=(15, 5), the output texel data are:
1st memory module: texel data for (S, T)=(16, 5)
2nd memory module: texel data for (S, T)=(13, 5)
3rd memory module: texel data for (S, T)=(14, 5)
4th memory module: texel data for (S, T)=(15, 5).
Again, the reason the value in the 1st memory module is discontinuous is that the address for the 1st memory module is produced through the adder 5A since the lowest two bits of S are 11.

The texel selector 4A selects the texel data $NA_1$ to $NA_3$ for (s0−1, t0), (s0, t0) and (s0+1, t0) from the above four texel data $LA_1$ to $LA_4$. Upon the selection, the lowest two digits of the input S are used as the select signal.

The essence in this invention resides in that the manipulative configuration of the multi-texture pattern memory 2A shown in FIG. 8 enables the texel selector 4A to be formed of a markedly simplified configuration. That is, the texel data at coordinate points (S,T)=(4n,m) is stored in the 1st memory module $10A_1$; the texel data at coordinate points (S,T)=(4n+1, m) is stored in the 2nd memory module $10A_2$; the texel data at coordinate points (S,T)=(4n+2, m) is stored in the 3rd memory module $10A_3$; and the texel data at coordinate points (S,T)=(4n+3, m) is stored in the 4th memory module $10A_4$. As a result, it is possible to locate the memory positions of the texel data for (s0−1, t0), (s0, t0) and (s0+1, t0) by checking the lowest two bits of the input S, whereby it is possible to select required texel data by using the three 4-input/1-output selectors.

Since the texel selector 4A as well as the adder 5A and subtracter 6A (with a few number of bits) is able to perform a fast operation and since only a single access to memory makes it possible to obtain necessary texel data NA, a texture pattern can successfully be obtained very fast. Further, since this method does not need a multiple number of the memory modules having the same content as required in the multi-memory technique, the configuration of this embodiment is excellent in the respect of needing a few number of memory modules.

Second Embodiment

Figure 13:
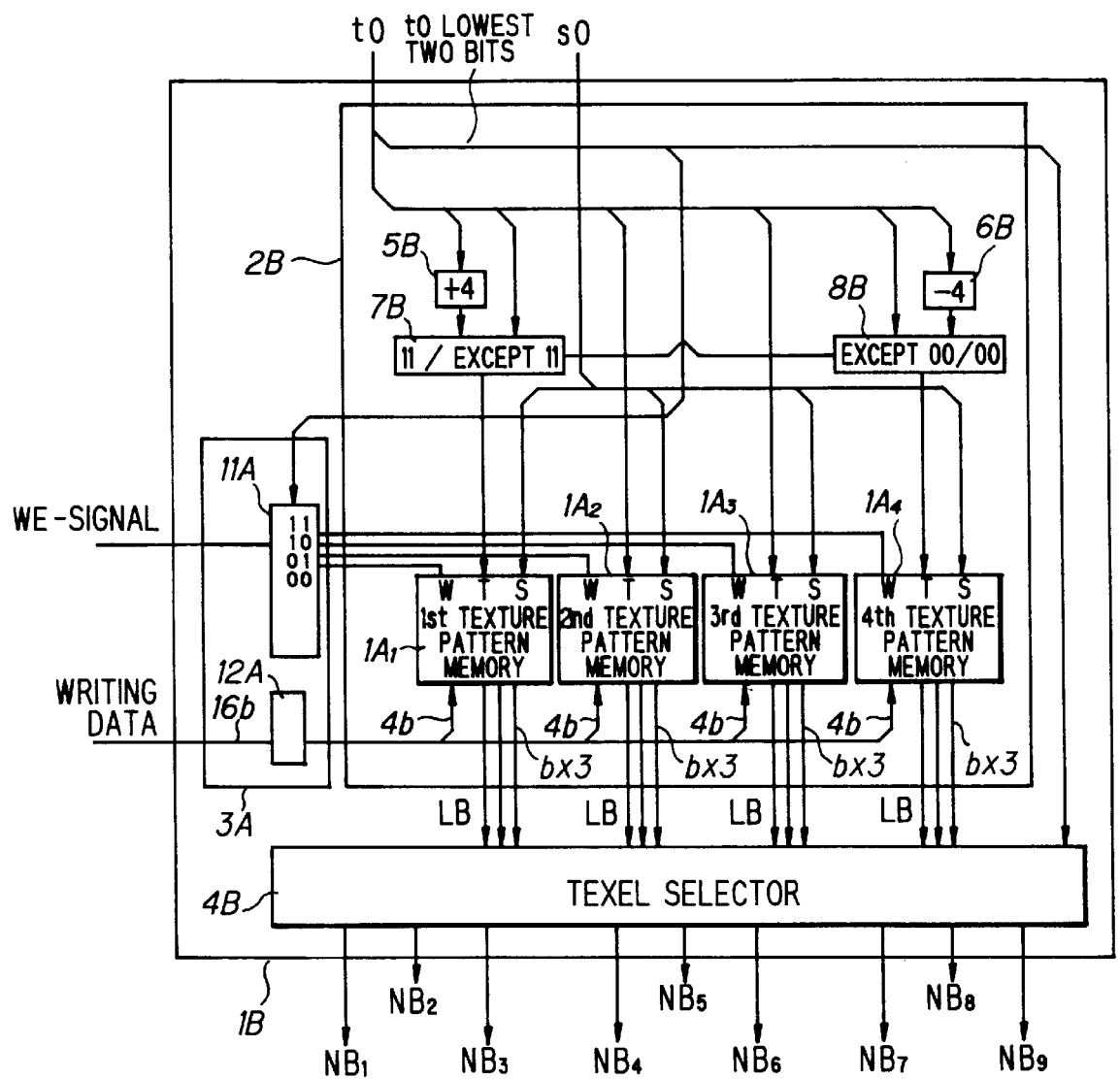
FIG. 13 is a block diagram showing a second embodiment of a texture pattern memory circuit in accordance with the invention.

FIG. 13 is a block diagram showing a second embodiment of a texture pattern memory circuit in accordance with the invention. This texture pattern memory circuit is to provide texel data $NB_1$ to $NB_9$ as to respective coordinate points (S,T), (S−1,T), (S+1,T), (S,T−1), (S−1, T−1), (S+1,T−1), (S,T+1), (S−1,T+1) and (S+1,T+1) in response to input (S,T). Similarly to the configuration shown in FIG. 8, this circuit is composed of a multi-texture pattern memory 2B, a writing device 3A and a texel selector 4B.

The multi-texture pattern memory 2B includes an adder 5B, a subtracter 6B, selectors 7B and 8B and four texture pattern memory circuits $1A_1$ to $1A_4$ of the first embodiment. The adder 5B adds 4 to an input T and the selector 7B selects one of the resultant value or the original T to output either of them to the 1st texture pattern memory circuit $1A_1$. The subtracter 6B subtracts 4 from the input T and the selector 8B selects one of the resultant value or the original T to output either of them to the 4th texture pattern memory circuit $1A_4$. An input S is supplied as it is to 1st and 4th texture pattern memory circuits $1A_1$ and $1A_4$. The 2nd and 3rd texture pattern memory circuits $1A_2$ and $1A_3$ are supplied with the originally input S- and T-values.

Figure 14:
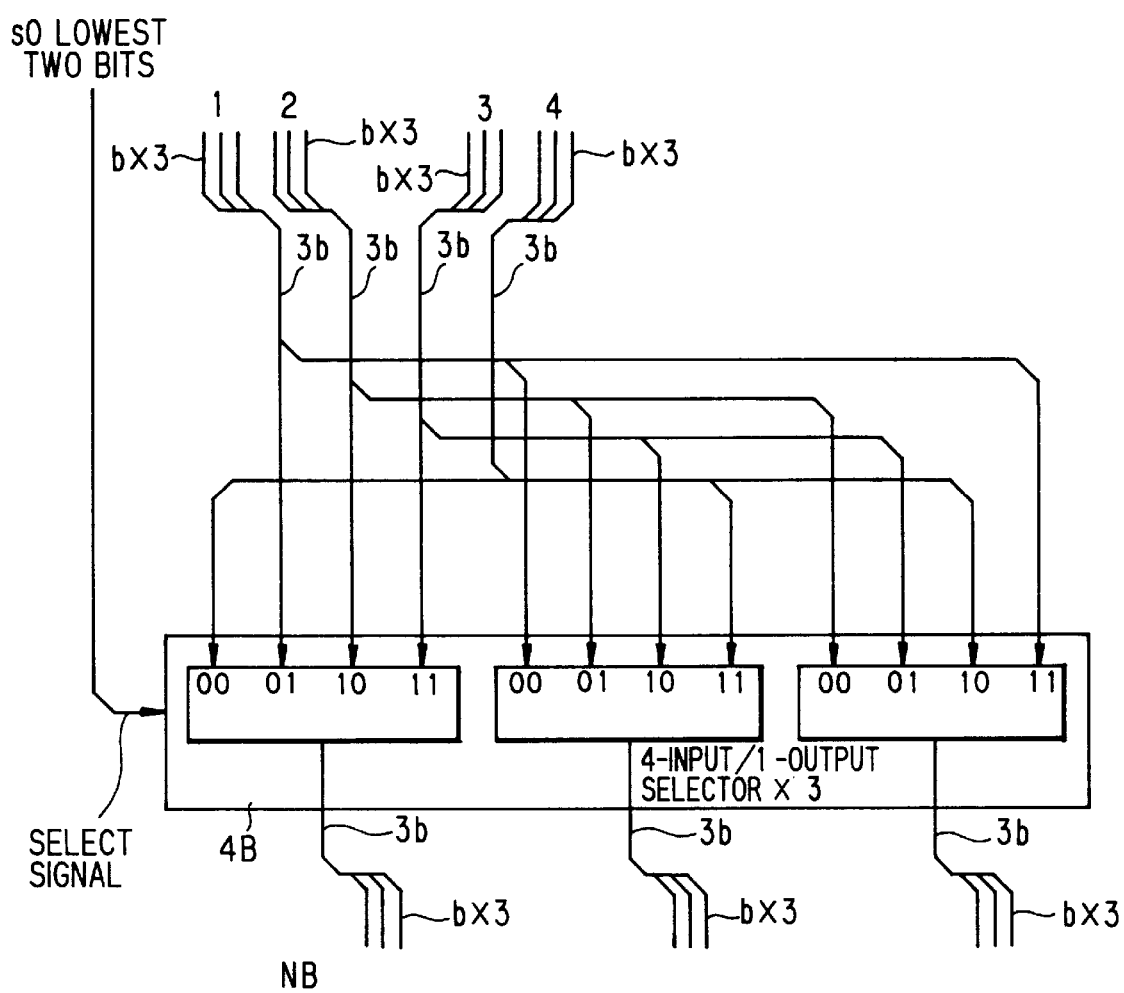
FIG. 14 is a block diagram showing a texel selector of a second embodiment.

The writing device 3A has the same configuration with that of the first embodiment shown in FIG. 8 therefore the detailed description is omitted. The texel selector 4B is formed of three 4-input/1-output selectors as shown in FIG. 14.

The 1st texture pattern memory circuit $1A_1$ stores texel data of texel coordinate points (S,T)=(n, 4m). The 2nd texture pattern memory circuit $1A_2$ stores texel data of texel coordinate points (S,T)=(n, 4m+1). The 3rd texture pattern memory circuit $1A_3$ stores texel data of texel coordinate points (S,T)=(n, 4m+2). The 4th texture pattern memory circuit $1A_4$ stores texel data of texel coordinate points (S,T)=(n, 4m+3).

Figure 19:
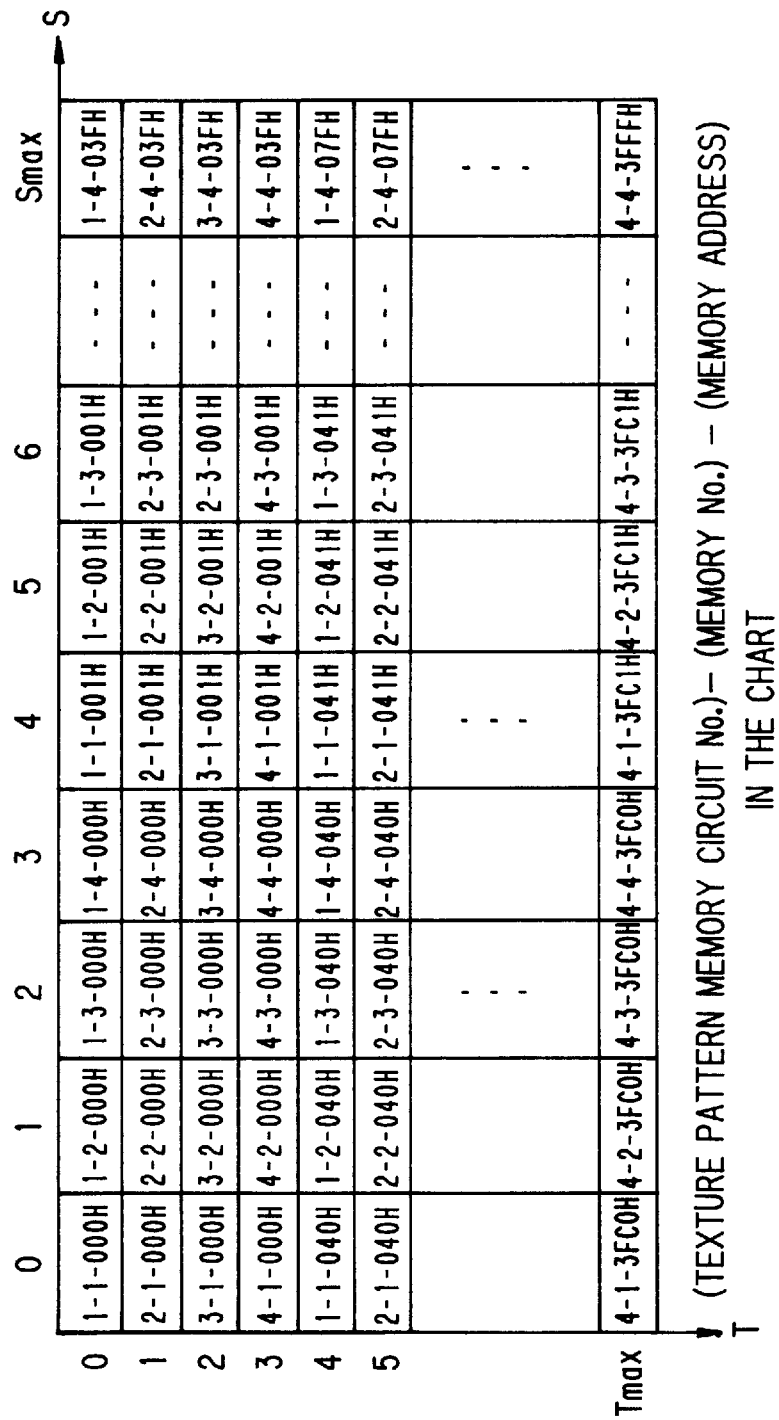
FIG. 19 is an illustrative view showing a relationship between addresses in memory modules in a multi-texture pattern memory and the ST-coordinate plane in a second embodiment.

FIGS. 15 through 19 are charts showing in detail the allocation of the stored texel data. FIGS. 15 through 18 are charts showing relationships between addresses in four memory modules and the coordinates in respective texture pattern memory circuits $1A_1$ to $1A_4$. The correspondence between (S,T) coordinate points and address numbers in the memory circuits is produced by assigning (S,T) coordinates sequentially from the circuit $1A_1$ to the circuit $1A_4$ as increasing the T-value. Specifically, the coordinate points with T=0 is allotted to the 1st texture pattern memory circuit $1A_1$, the coordinate point T=1 to the 2nd texture pattern memory circuit $1A_2$, the coordinate point T=2 to the 3rd texture pattern memory circuit $1A_3$, and the coordinate point T=3 to the 4th texture pattern memory circuit $1A_4$. Then, the coordinate points with T=4 is allotted again to the 1st texture pattern memory circuit $1A_1$. The relation between addresses in the memory modules and the coordinates in each of the texture pattern memory circuits $1A_1$ through $1A_4$ is the same as has been described in the first embodiment. FIG. 19 is a chart showing a relationship between the ST-coordinate plane and addresses in the memory circuits. Here, the notation in each frame represents (texture pattern memory circuit number)-(memory module number)-(memory address).

Next, the operation of the texture pattern memory circuit will be described.

When the lowest two bits of the T-value are 11, the adder 5B adds 4 to the T-value and the selector 7B inputs the resultant coordinate value to the 1st texture pattern memory circuit $1A_1$. When the lowest two bits of the T-value are 00, the subtracter 6B subtracts 4 from the T-value and the selector 8B inputs the resultant coordinate value to the 4th texture pattern memory circuit $1A_4$. This configuration allows the texture pattern memory circuits to output, in total, twelve texel data LB, which necessarily contain texel data NB for coordinate points (S,T), (S−1,T), (S+1,T), (S,T−1), (S−1, T−1), (S+1,T−1), (S,T+1), (S−1,T+1) and (S+1,T+1) because of the similar reason as described in the first embodiment.

The texel selector 4B selects the texel data $NB_1$ to $NB_9$ for the coordinate points (S,T), (S−1,T), (S+1,T), (S,T−1), (S−1, T−1), (S+1,T−1), (S,T+1), (S−1,T+1) and (S+1,T+1) from the twelve texel data LB, based on the lowest two bits of the input T-value.

Thus, the texel data for a coordinate point (S,T) and the eight texel data for the peripheral area adjoining to the texel point can be obtained by a single access without redundantly using plurality of memories. As a result, the configuration of this embodiment is able to realize high-speed access as well as to attain a markedly excellent memory efficiency.

Further, as the second embodiment shown in FIG. 13 is formed of a twofold configuration including the writing device 3A and the texel selector 4B outside the texture pattern memory circuits $1A_1$ to $1A_4$ in which a writing device and a texel selector is provided, it is possible to integrate these elements into a united structure, whereby the circuit is further improved in its operation speed and can be downsized and simplified in its structure.

Third Embodiment

The first embodiment shown in FIG. 8 uses four memory modules $10A_1$ to $10A_4$ inside the texture pattern memory circuit 2A. This design is to allow each of the memory modules $10A_1$ to $10A_4$ to be accessed by a separate input address. In this configuration, however, it can be noticed that the second and third memory modules $10A_2$ and $10A_3$ are always accessed by the same input address. This means that the second and third memory modules $10A_2$ and $10A_3$ can be integrated into a single memory unit having a data output width of two texel data. This idea is realized in the following third embodiment in which the memory modules in the multi-texture pattern memory 2A are reduced in number.

Figure 20:
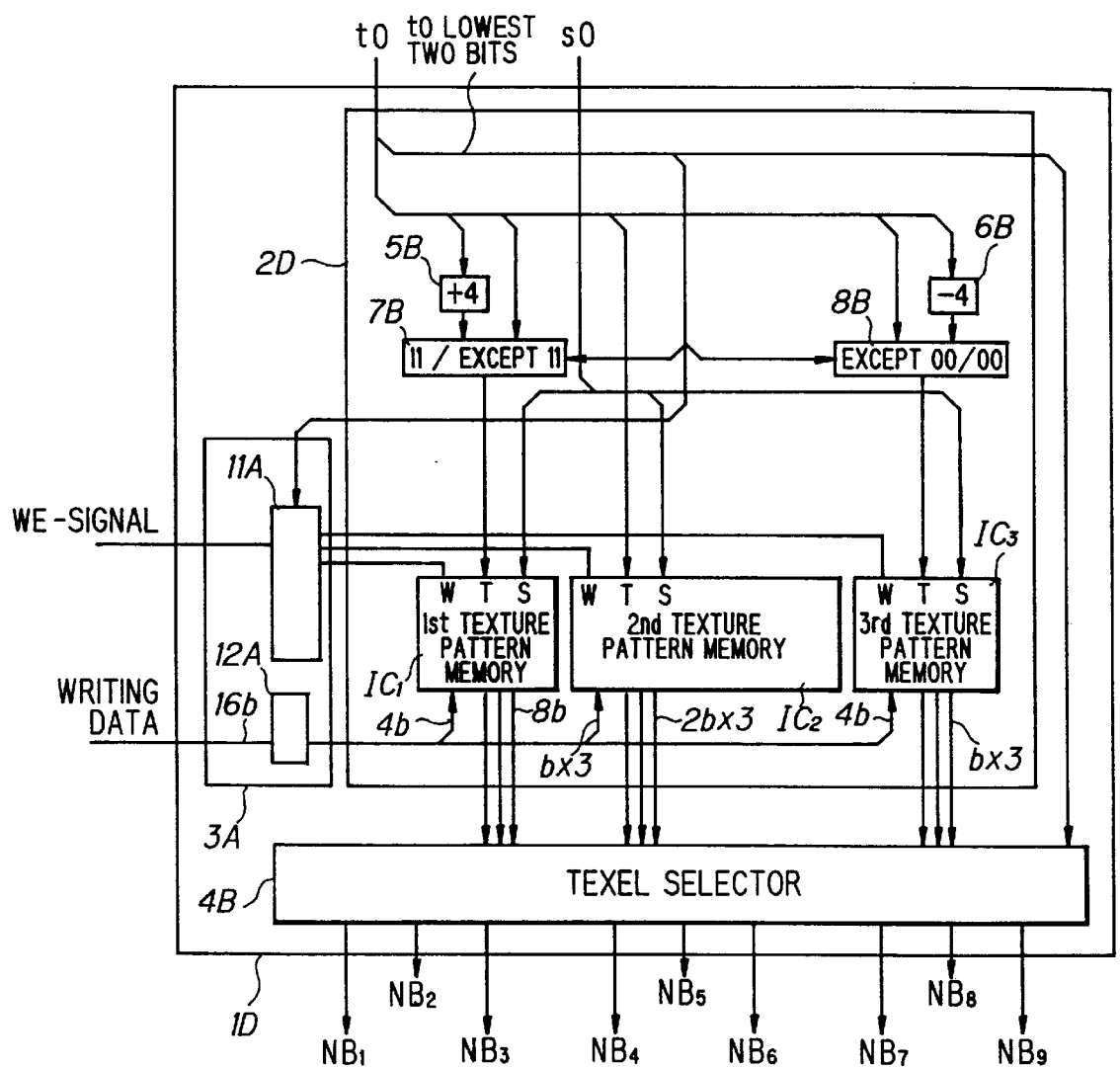
FIG. 20 is a block diagram showing a third embodiment of a texture pattern memory circuit in accordance with the invention.

FIG. 20 is a block diagram showing the third embodiment of a texture pattern memory circuit in accordance with the invention. This texture pattern memory circuit designated at 1D is to provide texel data NB for coordinate points (S,T), (S−1,T), (S+1,T), (S,T−1), (S−1, T−1), (S+1,T−1), (S,T+1), (S−1,T+1) and (S+1,T+1) in response with input (S,T). The configuration of this circuit is basically almost the same with that of the second embodiment, therefore the corresponding components are designated with the identical reference numerals and the detailed description will be omitted.

Figure 21:
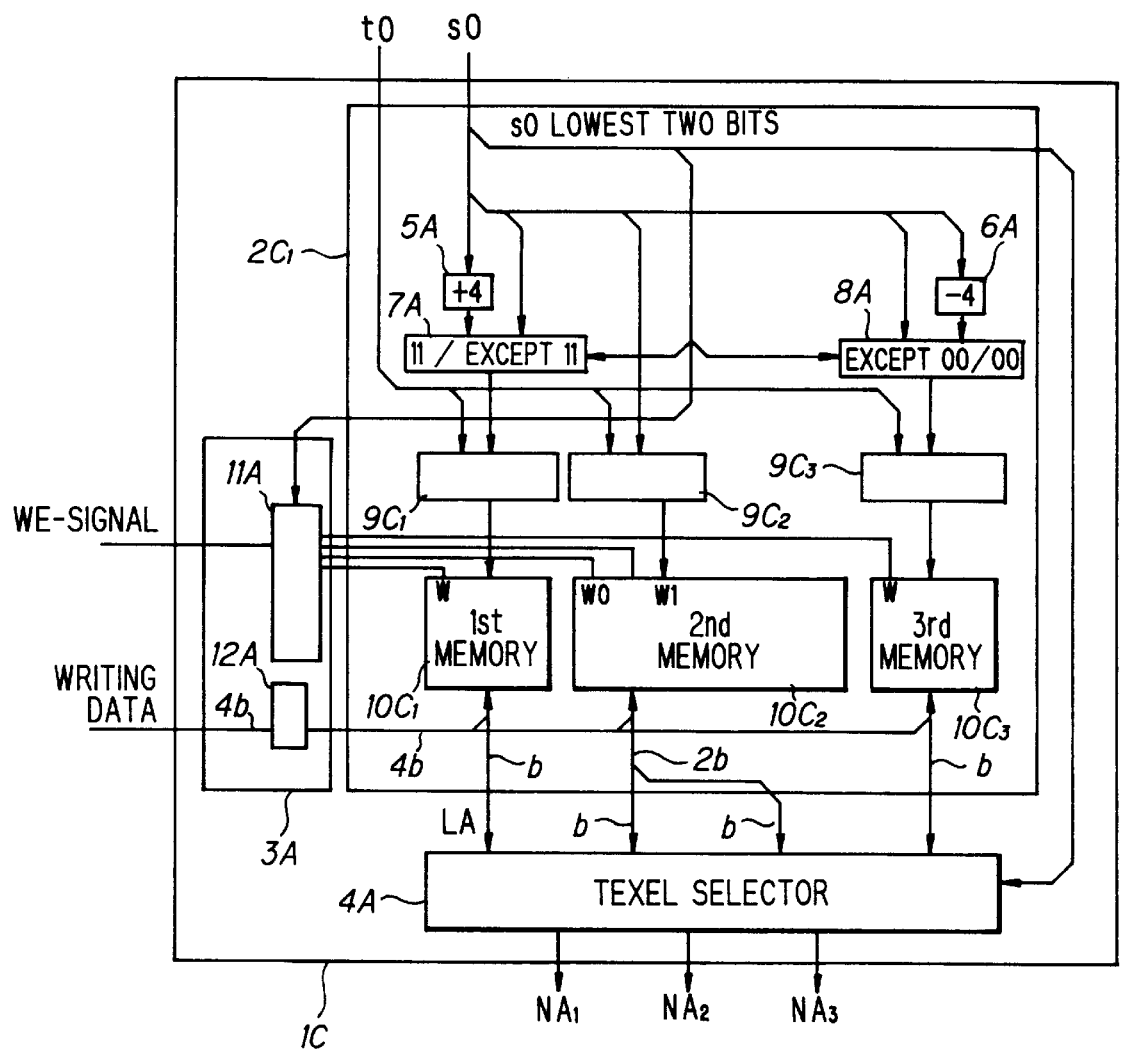
FIG. 21 is a block diagram showing a texture pattern memory circuit used in a multi-texture pattern memory of a third embodiment.

The texture pattern memory circuit 1D is characterized by the use of texture pattern memory circuits 1C shown in FIG. 21 as the memory. The texture pattern memory circuit 1C basically has almost the same configuration as in the first embodiment, therefore the corresponding components are designated with the same reference numerals and the detailed description will not be repeated. First and third memory modules $10C_1$ and $10C_3$ are the same as the 1st and 4th memory modules $10A_1$ and $10A_4$, respectively, used in the first embodiment. First and third address converting devices $9C_1$ and $9C_3$ are also the same as the 1st and 4th address converting devices $9A_1$ and $9A_4$ used in the first embodiment. The second memory module $10C_2$, differing from the above memory modules, has the combined function of the second and third memory modules $10A_2$ and $10A_3$, with the twofold bit width. Thus, the number of memory blocks is reduced from four to three. Accordingly, the second address converting device $9C_2$ that outputs addresses to the second memory module $10C_2$ also has the combined function of the second and third address converting devices $9A_2$ and $9A_3$. Other configurations than the above are the same with those in the first embodiment.

The first and third texture pattern memory circuits $1C_1$ and $1C_3$ shown in FIG. 20 have the configuration of the texture pattern memory circuit 1C shown in FIG. 21. The bit width to be processed in the second texture pattern memory circuit $1C_2$ is twice as long as that of the texel data processed in the texture pattern memory circuit 1C shown in FIG. 21. Accordingly, each memory module used in the second texture pattern memory circuit $1C_2$ should have twice the bit number as that of the corresponding memory module in the texture pattern memory circuit 1C shown in FIG. 21. Consequently, as compared to the second embodiment, the number of the texture pattern memory circuits for multi-texture pattern memory is reduced from 4 to 3. Therefore, sixteen blocks of memory required in total in the second embodiment can be reduced to nine blocks of memory in this embodiment.

Figure 24:
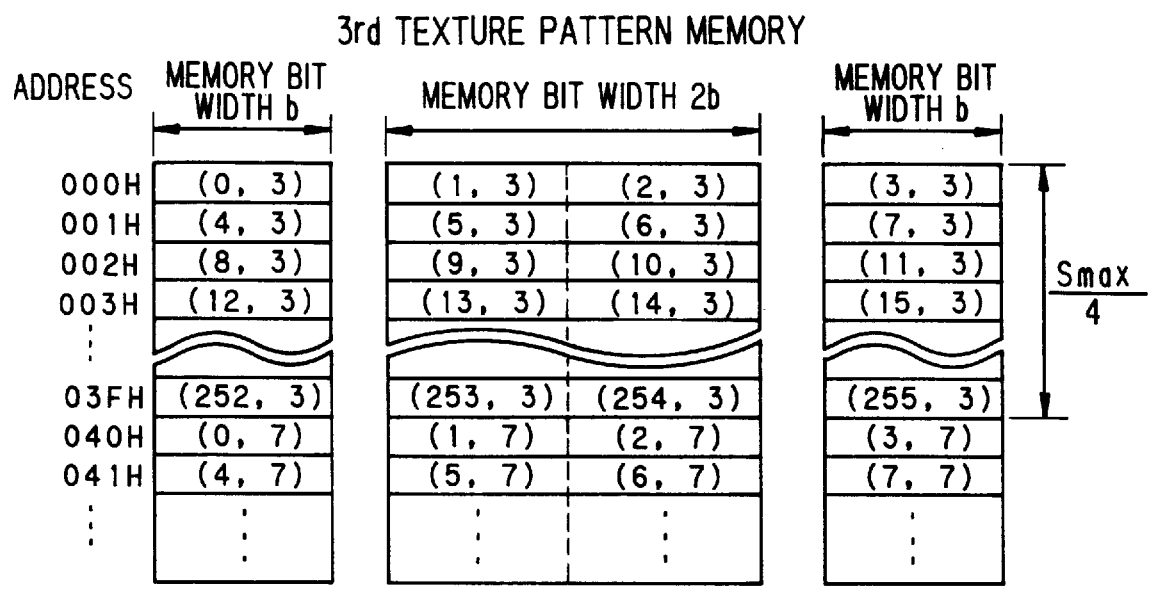
FIG. 24 is an illustrative view showing a relationship between addresses in memory modules in a 3rd texture pattern memory circuit used in a multi-texture pattern memory of a third embodiment and coordinates (S,T) in a second embodiment.
Figure 25:
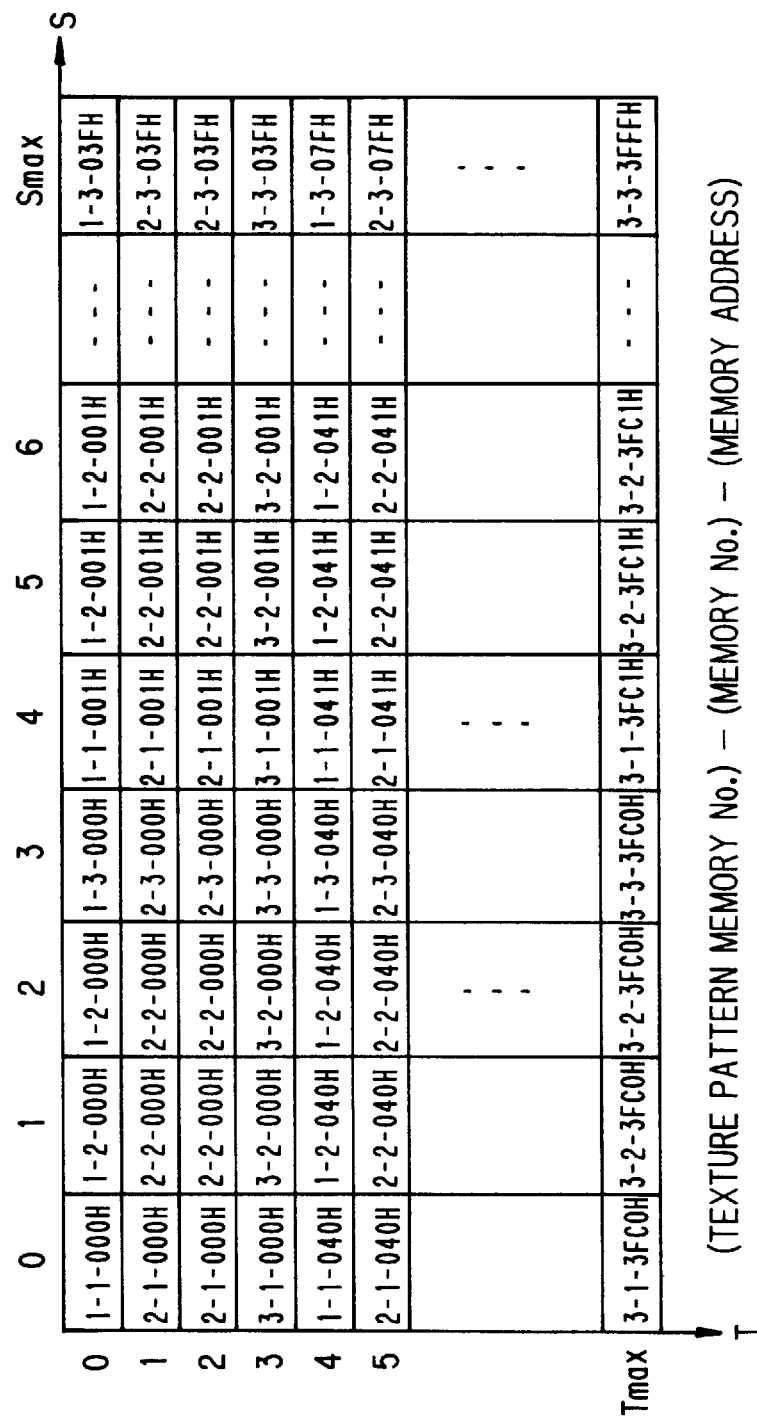
FIG. 25 is an illustrative view showing a relationship between addresses in memory modules of a texture pattern memory circuit used in a multi-texture pattern memory of a third embodiment and the ST-coordinate plane.

FIGS. 22 through 25 are charts showing in detail the allocation of the stored texel data in the third embodiment. FIGS. 22 through 24 are charts showing relationships between the memory addresses and the coordinates. FIG. 25 is a chart showing a relationship between the ST-coordinate plane and the memory. Although the positions of the texel data stored in the memory are changed due to the variations of the bit width as compared to the stored texel data in the second embodiment, the overall configuration remains unchanged. Accordingly, the output from the multi-texture pattern memory 2D is the same with that of the multi-texture pattern memory 2B of the second embodiment, the texel selector 4B used here is identical with that used in the second embodiment.

When the memory module used in the multi-texture pattern memory of the second embodiment has a capacity of 'a' with a data bit width of 'b', the number of memory blocks to be required on the following conditions are:

four memory blocks are required when the memory module has a capacity of 'a' with a data bit width of 'b';

two memory blocks are required when the memory module has a capacity of '2a' with a data bit width of '2b'; and one memory block are required when the memory module has a capacity of '4a' with a data bit width of '4b'.

Thus, it is possible to reduce the number of memory blocks by using memory modules having a greater capacity. For example, suppose that there are two kinds of memory modules $M_1$ and $M_2$: the module $M_1$ has a capacity of 'a' with a data bit width of 'b'; and the module $M_2$ has a capacity of '2a' with a data bit width of 'b'. In this case, the multi-texture pattern memory 2B of the second embodiment needs 16 memory modules M1 while the third embodiment is able to realize the same operation with four memory modules $M_1$ and five memory modules $M_2$.

In this way, the use of the texture pattern memory circuit of the third embodiment reduces the number of the address converting devices and enables the multi-texture pattern memory to be configurated in a reduced circuit scale, whereby it is possible to make the circuit compact as well as to improve the assembly performance.

Fourth Embodiment

In the first embodiment shown in FIG. 8, three outputs of texel data NA are produced by using the texel selector 4A. Now, suppose that each output of texel data has a bit width of 24 bits, the bit width of the output from the texel selector 4A will be, in total, 72 bits. This assumption of 24 bits is a usual value for texel data, so that there is a large possibility that the output from the texel selector 4A would be 72 bits in its width. In the practical manufacturing of the circuit, however, it sometimes happens to be troublesome to distribute lines for high-speed data signals of 72 bits because crosstalk between the signals might happen or additional capacitance may arise. To deal with such a situation, there is a method of interchanging bulky high-speed data by constructing a bus-driving system to reduce the number of bits or the bit width of the output. As the bit width is reduced by this scheme, the problems mentioned above in the high-speed circuit design can be diminished.

Figure 26:
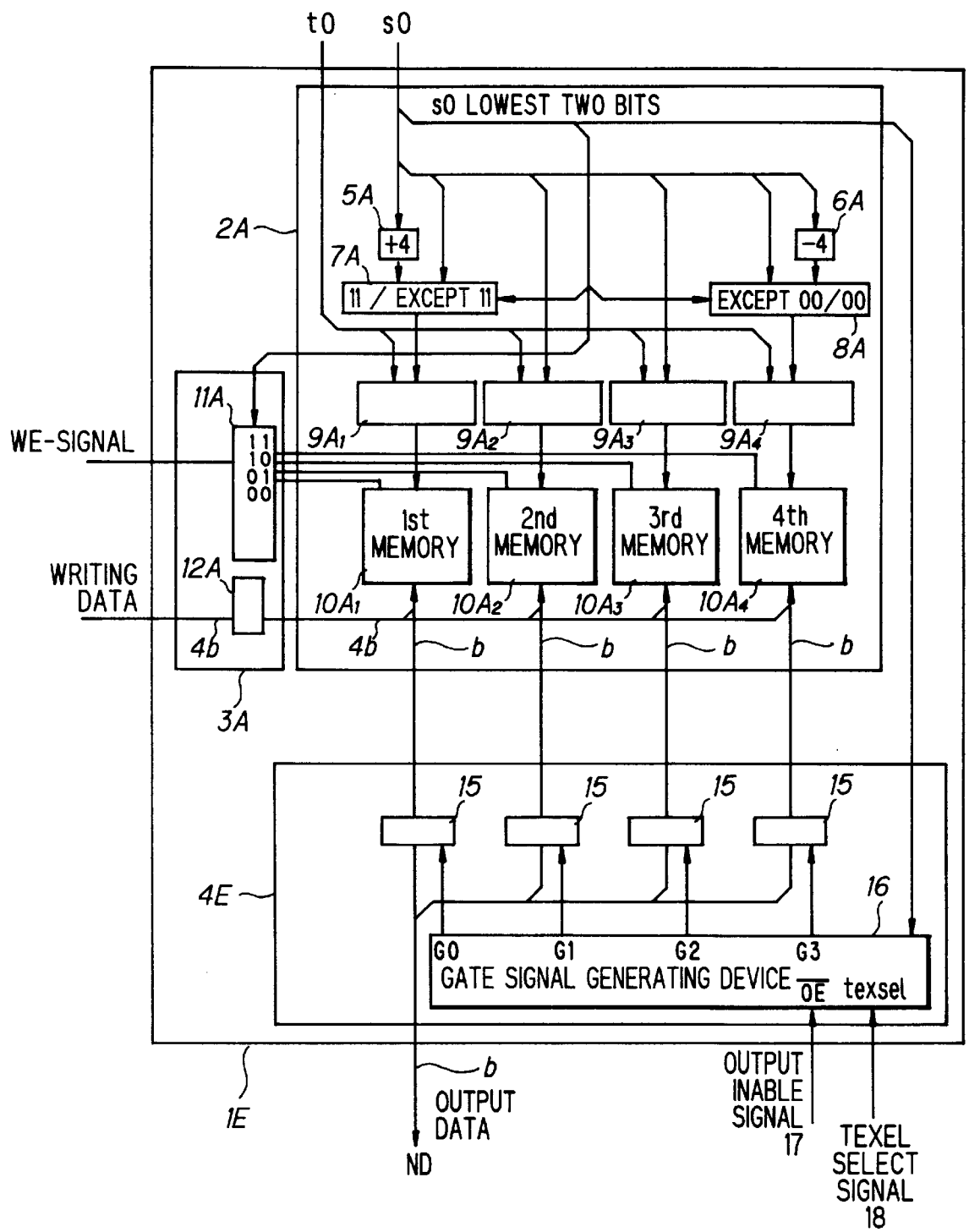
FIG. 26 is a block diagram showing a fourth embodiment of a texture pattern memory circuit in accordance with the invention.

A fourth embodiment shown below realizes a bus-driving system of the texel data output section by constructing its texel selector of data buffers and gate signal generating circuit. FIG. 26 is a block diagram showing the fourth embodiment of a texture pattern memory circuit in accordance with the invention. The texture pattern memory circuit 1E is basically configurated of substantially the same structure as that of the first embodiment, so that the corresponding parts will be designated with the same reference numerals and the detailed description of those parts will be omitted. In the first embodiment, the texel data output NA has a bit width of '3b' whereas a texel data output ND in the fourth embodiment has a bit width of 'b'. A texel selector 4E is composed of four data buffers as to be texel data selecting gates 15 and a gate signal generating device 16.

The gate signal generating device 16 is supplied with a texel select signal 18 for determining which texel data is to be outputted onto the texel data bus and the lowest two bits of the input S-value and produces four gate signals G0 to G3 for determining which gate of four texel data selecting gates 15 is to be opened. Further, the gate signal generating device is constructed such that with an output enable (OE) signal 17 supplied at H-level, all the gate signals will be set at H-level so that the texel data bus will have a high impedance. In this condition, the texel data selecting gates 15 will not flow the texel data to the texel data bus. When the gate signal is at L-level, the texel data selecting gate 15 will flow the texel data to the texel data bus.

Figure 27:
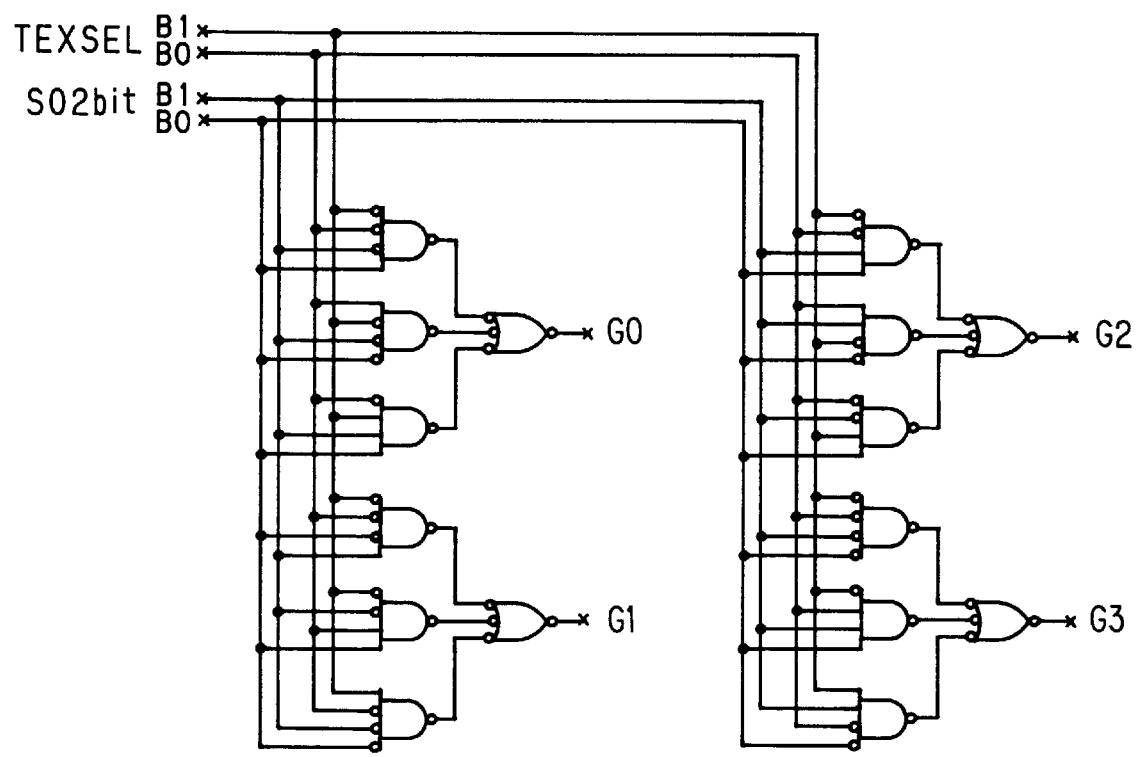
FIG. 27 is a diagram showing a logical circuit of a gate signal generating device used in a texel selector of a fourth embodiment.

FIG. 27 shows an example of a circuit of the gate signal generating device.

When texel select signal is composed of two bits, namely TB0 and TB1, and the lowest two bits of an input S-value are SB0 and SB1, the circuit configuration can be formed as follows:

a first logical circuitry is composed of a NAND gate with the inputs TB1, TB0 and SB1 inverted and the input SB0 non-inverted, a NAND gate with the input TB0 non-inverted and the inputs TB1, SB1 and SB0 inverted, a NAND gate with the input TB0 inverted and the inputs TB1, SB1 and SB0 non-inverted, and a NOR gate supplied with inverted outputs from the three NAND gates to produce G0;

a second logical circuitry is composed of a NAND gate with the inputs TB1, TB0 and SB0 inverted and the input SB1 non-inverted, a NAND gate with the inputs TB1 and SB1 inverted and the inputs TB0 and SB0 non-inverted, a NAND gate with the input TB1 non-inverted and the inputs TB0, SB1 and SB0 inverted, and a NOR gate supplied with inverted outputs from the three NAND gates to produce G1;

a third logical circuitry is composed of a NAND gate with the inputs TB1 and TB0 inverted and the inputs SB1 and SB0 non-inverted, a NAND gate with the inputs TB0 and SB1 non-inverted and the inputs TB1 and SB0 inverted, a NAND gate with the inputs TB0 and SB1 inverted and the inputs TB1 and SB0 non-inverted, and a NOR gate supplied with inverted outputs from the three NAND gates to produce G2; and a fourth logical circuitry is composed of a NAND gate with all inputs TB1, TB0, SB1 and SB0 inverted, a NAND gate with the input TB1 inverted and the inputs TB0, SB1 and SB0 non-inverted, a NAND gate with the inputs TB1 and SB1 non-inverted and the inputs TB0 and SB0 inverted, and a NOR gate supplied with inverted outputs from the three NAND gates to produce G3.

In the thus configurated texel selector 4E, the outputs from the multi-texture pattern memory modules $10A_1$ to $10A_4$ are selectively outputted in the following manner. That is, the texel select signal 18 is composed of 2 bits based on which of the data is outputted as follows:

if the texel select signal is 00, (S−1, T);
if the texel select signal is 01, (S, T);
if the texel select signal is 10, (S+1, T); and
if the texel select signal is 11, indefinite, where the value of the texel select signal is written in the form of bits.

Figure 28:
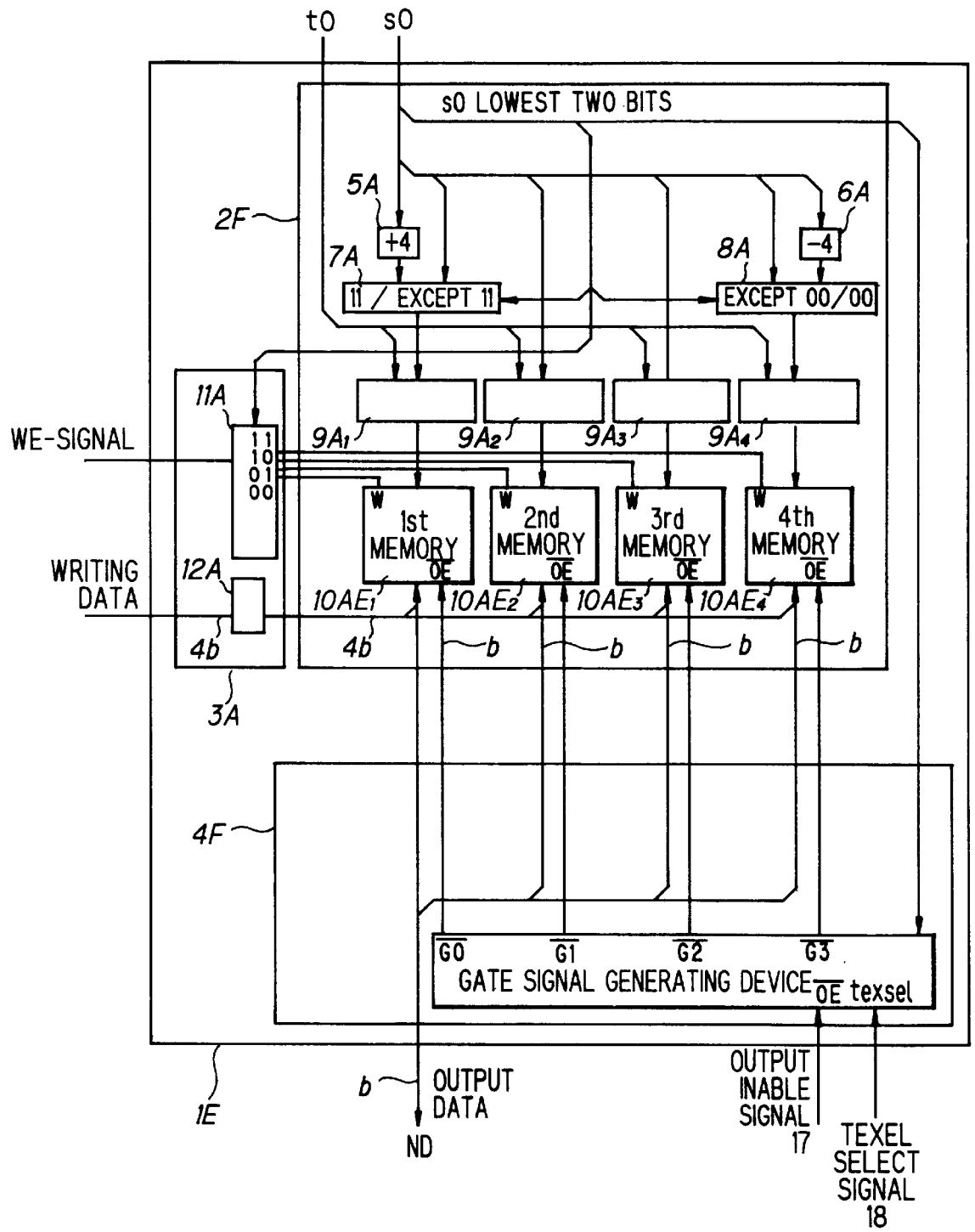
FIG. 28 is a block diagram sowing a texture pattern memory circuit of a fourth embodiment using memory modules with an OE signal input.

Although, in the fourth embodiment the texel data selecting gates 15 for data buffers are used to switch the output to the texel data bus, RAMs (Random Access Memories) to be used in practice have OE signal inputs having the switching function so that it is possible to effect data switching in each multi-texture pattern memory. FIG. 28 is a block diagram showing a texture pattern memory circuit using the above method. Unlike the configuration in FIG. 27, the gate signals from the gate signal generating device 16 are directly inputted to the OE signal inputs of the memory modules $10AE_1$ to $10AE_4$ with no texel gates 15 interposed therebetween.

The fourth embodiment produces the same data stream with those outputted in the conventional multi-accessing method. Still, the switching method using buffers allows a faster operation than the schemes such as the multi-accessing method in which addresses should be repeatedly calculated, because the time for the address calculation can be cut down. Further, although the order of outputting the texel data in the multi-accessing method is specified by the circuit configuration, the fourth embodiment has an advantage that a plurality of texels can be selectively accessed based on the texel select signal.

The bit width of the outputs from the texel selector 4A can be reduced by developing the outputs into the bus-driving system, whereby it is possible to inhibit crosstalk between the signals and generation of additional capacitance. Accordingly, it is possible to reduce the noises in the circuit even when a mass of data is interchanged.

Fifth Embodiment

Figure 29:
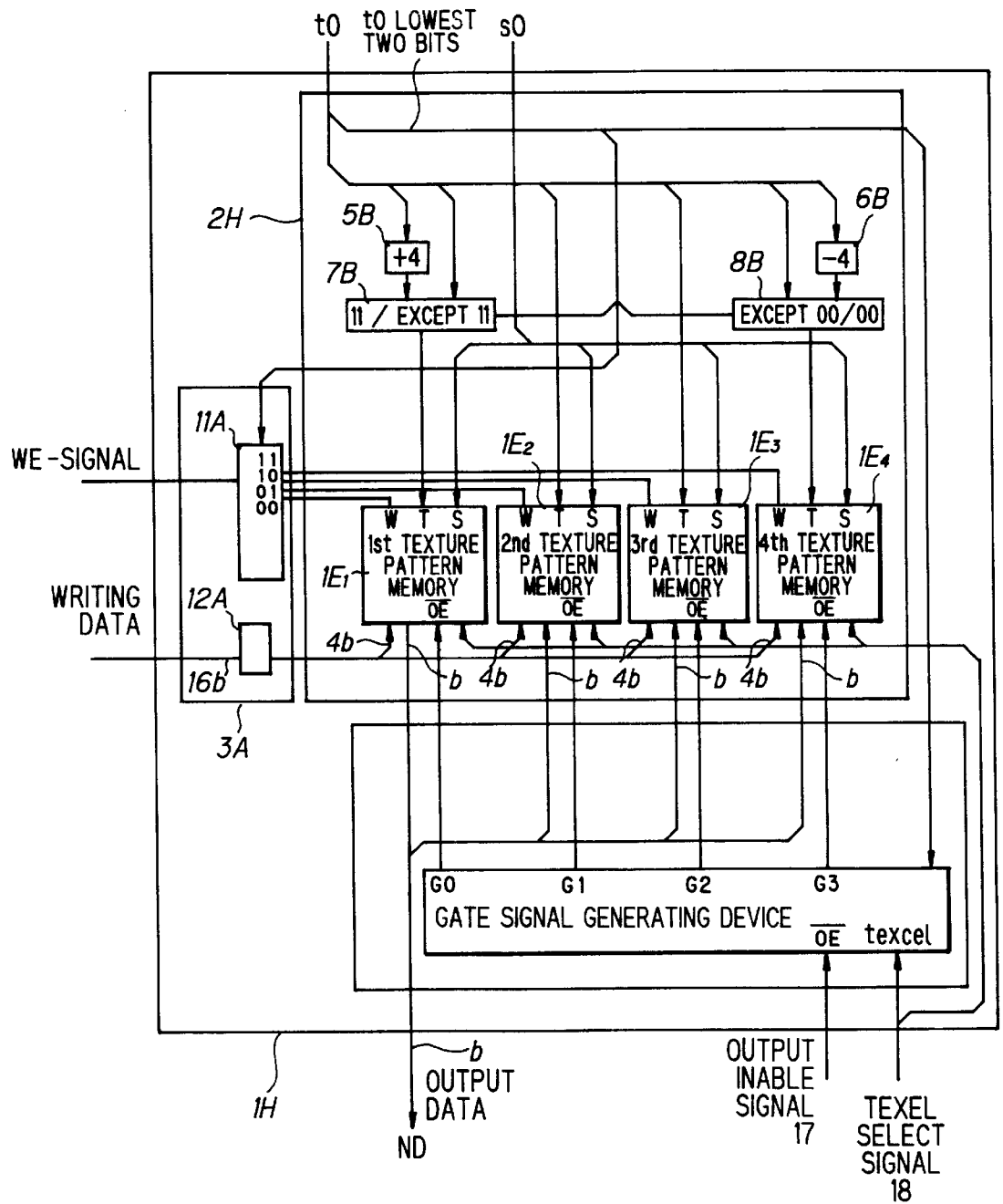
FIG. 29 is a block diagram showing a fifth embodiment of a texture pattern memory circuit in accordance with the invention.

FIG. 29 is a block diagram showing a fifth embodiment of a texture pattern memory circuit in accordance with the invention. The texture pattern memory circuit designated at 1H is equivalent to the second embodiment in which the texel data is driven by the bus-driving system as in the manner shown in the fourth embodiment. The corresponding components to those in the second embodiment are allotted with the same reference numerals and the description of those components will be omitted.

Each of texture pattern memory circuits $1E_1$ to $1E_4$ in a multi-texture pattern memory 2H is composed of the texture pattern memory circuit of the fourth embodiment. Each of the texture pattern memory circuits $1E_1$ to $1E_4$ is supplied with the lowest two bits of a texel select signal 18 composed of four bits. Gate signals G0 to G3 from a gate signal generating device 16 are inputted as OE signals to respective texture pattern memory circuits $1E_1$ to $1E_4$.

The gate signal generating device 16 is the same with that used in the fourth embodiment and is supplied with the upper two bits of the texel select signal 18, as the select signal. The outputs to texel data bus based on the texel select signal 18 are:

If 0000: (S−1, T−1)
If 0001: (S, T−1)
If 0010: (S+1, T−1)
If 0100: (S−1, T)
If 0101: (S, T)
If 0110: (S+1, T)
If 1000: (S−1, T+1)
If 1001: (S, T+1)
If 1010: (S+1, T+1)

Here, in the cases of the select signals unreferred above, the output is indefinite.

Thus, it is possible to develop the outputs into the bus-system in the same manner as in the fourth embodiment, whereby it is possible to reduce noises in the circuit.

Further, as the fifth embodiment shown in FIG. 29 includes the gate signal generating circuits in the two fold structure, it is possible to integrate these circuits into a united structure, whereby the circuit is further improved in its operation speed.

Although the invention has been described as to the preferred embodiments, it should be understood that the present invention is not limited to those described above. In the description of the embodiments, the configuration in which the memory modules in the multi-texture pattern memory are replaced by the texture pattern memory circuits to form a twofold structure has been described. Similarly, it is possible to recursively construct a multi-fold structured circuit in such a manner that the memory modules are replaced with texture pattern memory circuits, in which the memory modules nested are further replaced with texture pattern memory circuits. This configuration allows a great number of texel data to be addressed at a single access and therefore is able to effectively deal with such a case that a great number of texel data is required to calculate pixel values. Consequently, it is possible to improve the memory efficiency as well as the operation speed. Since the writing devices as well as the texel selectors must be in the form of a multi-fold structure, these elements can also be integrated into a united structure whereby the circuit is further improved in its operation speed and can be downsized and simplified in its structure.

What is claimed is:

1. A texture pattern memory circuit for storing a plurality of data as texel data, each of which represents a single dot in a texture pattern, and outputting only a number of texel data required for texture mapping, comprising:

a storing device including a memory circuit for storing texel data by setting up an identical address for each group of texel coordinate points in series and for outputting, when a texel coordinate point is inputted to read out texel data, a plurality of texel data for a group of texel coordinate points in series based on the address specified by the input texel coordinate point, when one of adjoining texel coordinate points of an input texel coordinate point which are arrayed sequentially in coordinate order has a different address than that of the input texel coordinate point, part of the texel coordinate points having the same address as that of the input texel coordinate point is replaced so that the input texel coordinate point occupies a substantially central position in the group of the texel coordinate points in series to be read out;

a writing device for writing texel data of texel coordinate points into the memory circuit at respective addresses set up in conformity with the texel coordinate points so that texel data for each group of texel coordinate points are arranged sequentially at memory locations with the same address in the memory circuit; and a reading and selecting device for reading m texel data, in accordance with a specified address, from said storing device when a texel coordinate point is inputted and for selecting for output n texel data from the m texel data, wherein n<m.

2. The texture pattern memory circuit according to claim 1 wherein said storing device comprises:

an adder for adding a number of texel coordinate points in series having the same address to the input texel coordinate point;

a subtracter for subtracting the number of texel coordinate points in series having the same address from the input texel coordinate point;

a first selector for selecting an output from said adder when the texel coordinate point following the input texel coordinate point has a different address than the input texel coordinate point and selecting the input texel coordinate point otherwise;

a second selector for selecting an output from said subtracter when the texel coordinate point prior to the input texel coordinate point has a different address than the input texel coordinate point and selecting the input texel coordinate point otherwise;

address converting devices for calculating addresses based on the texel coordinate point output from said first selector, the texel coordinate point output from said second selector and the input texel coordinate point, respectively; and memory means formed of a plurality of modules for storing texel data for texel coordinate points sequentially into memory locations with addresses specified by said address converting devices.

3. The texture pattern memory circuit according to claim 2, respectively comprising as many of said address converting devices and the plurality of modules as the number of texel coordinate points in series having the same address, addresses in the plurality of modules being designated by said address converting devices.

4. The texture pattern memory circuit according to claim 2, wherein said adder and said first selector, and said subtracter and said second selector, are logically built in respective ones of said address converting devices.

5. The texture pattern memory circuit according to claim 2, wherein said address converting devices are sectioned into a plurality of parts for calculating addresses based on the texel coordinate point output from said first selector, the texel coordinate point output from said second selector and the input texel coordinate point, respectively, and each part is formed of an integrated structure.

6. The texture pattern memory circuit according to claim 2, wherein the address of the plurality of modules of said memory means is designated based on the texel coordinate point output from said first selector, the texel coordinate point output from said second selector or the input texel coordinate point, each of the plurality of modules being formed of an integrated structure.

7. The texture pattern memory circuit according to claim 2, wherein said reading and selecting device comprises selectors which are each supplied with all the m texel data read out in parallel from the plurality of modules and each select one required data output based on the input texel coordinate point from the supplied m texel data, said reading and selecting device including as many of said selectors as the number of texel data required for texture mapping and outputting respective, selected n texel data in parallel.

8. The texture pattern memory circuit according to claim 2, wherein said reading and selecting device selects a required set of n texel data from a plurality of m texel data read out from the plurality of modules based on the input texel coordinate point and selectively outputs the selected n texel data onto a bus in response to input of a texel select signal.

9. The texture pattern memory circuit according to claim 2, wherein said reading and selecting device comprises:
a gate signal generating device for generating a gate signal based on the input texel coordinate point and an input texel select signal; and
a plurality of texel data selecting gates each selecting a single texel data output from the m texel data read from the plurality of modules and sending the corresponding single texel data output onto a bus for transmitting data having one texel data width.

10. The texture pattern memory circuit according to claim 2, wherein each of the plurality of modules has an input terminal for enabling and disabling data output,
said reading and selecting device having a gate signal generating device for generating gate signals based on the input texel coordinate point and an input texel select signal, the gate signals being supplied to the input terminal of each of the plurality of modules to thereby selectively output the n texel data onto a bus having one texel data width.

11. The texture pattern memory circuit according to claim 2, wherein said writing device comprises:
a write selector for selecting one of the plurality of modules to be written in with reference to the input texel coordinate point and transmitting a writing signal; and
a write data gate for allowing data to be supplied to the plurality of modules only during a write operation.

12. The texture pattern memory circuit according to claim 2, wherein said writing device comprises:
a write selector for selecting one of the plurality of modules with reference to the input texel coordinate point and transmitting a writing signal; and
a write data gate for allowing texel data for texel coordinates to be outputted to the plurality of modules only during a write operation.

13. The texture pattern memory circuit according to claim 12, wherein a plurality of said writing devices and a plurality of said reading and selecting devices are integrated into a unitary structure.

14. The texture pattern memory circuit of claim 1, wherein said storing device outputs the texel data for a group of texel coordinate points in series for greater than two texel coordinate points.

15. A method of accessing a plurality of texel data in a texture pattern memory, each of the plurality of texel data representing a single dot in a texture pattern, comprising the steps of:
a) setting up respective identical addresses in a memory for groups of texel coordinate points;
b) writing texel data of texel coordinate points into the memory at addresses set up in said step a) in conformity with the texel coordinate points, texel data for each group of texel coordinate points being arranged in the memory sequentially at memory locations with the same address;
c) reading m texel data of a group of texel coordinate points in series when a texel coordinate point is inputted; and
d) selecting n texel data from the m texel data read in said step c) in accordance with the input texel coordinate point, wherein n<m, said step c) comprising replacing texel coordinate points of the group of texel coordinate points when one of adjoining texel coordinate points of the input texel coordinate point has a different address than the input texel coordinate point so that the input texel coordinate point occupies a substantially central position in the group of texel coordinate points corresponding to the plurality of m texel data read.

16. The method of accessing a plurality of texel data of claim 15, wherein the group of texel coordinate points includes m texel data,
said step c) comprising adding m to the input texel coordinate point to provide a new texel coordinate point and replacing one of the texel coordinate points of the group of texel coordinate points with the new texel coordinate point when the adjoining texel coordinate point that has a different address is a texel coordinate point following the input texel coordinate point.

17. The method of accessing a plurality of texel data of claim 15, wherein the group of texel coordinate points includes m texel data,
said step c) comprising subtracting m from the input texel coordinate point to provide a new texel coordinate point and replacing one of the texel coordinate points of the group of texel coordinate points with the new texel coordinate point when the adjoining texel coordinate point that has a different address is a texel coordinate point prior to the input texel coordinate point.

18. The method of accessing a plurality of texel data of claim 15, wherein said step d) comprises:
d1) generating a gate signal based on the input texel coordinate point and an externally provided texel select signal;
d2) providing the m texel data read in said step c) to a plurality of gates; and
d3) selecting a single texel data from the m texel data provided to the plurality of gates in said step d2) in accordance with the gate signal generated in said step d1).

19. The method of accessing a plurality of texel data of claim 15, wherein said step c) comprises reading a plurality of texel data of greater than two texel coordinate points.

20. A texture pattern memory apparatus comprising:
a texture pattern memory for storing a plurality of texel data, each of the plurality of texel data representing a single dot in a texture pattern;
writing means for writing texel data of texel coordinate points into said texture pattern memory at addresses such that texel data of respective groups of texel coordinate points are arranged sequentially and have respective identical addresses;
reading means for reading m texel data of a group of texel coordinate points in series from said texture pattern memory in response to input of a texel coordinate point; and
selecting means for selecting n texel data from the m texel data read by said reading means, wherein n<m,
said reading means replacing texel coordinate points of a group of texel coordinate points when one of adjoining texel coordinate points of the input texel coordinate point has a different address than the input texel coordinate point so that the input texel coordinate point occupies a substantially central position in the group of texel coordinate points corresponding to the m texel data read by said reading means.

21. The texture pattern memory apparatus of claim 20, wherein the group of texel coordinate points includes m texel data, said reading means adding m to the input texel coordinate point to provide a new texel coordinate point and replacing one of the texel coordinate points of the group of texel coordinate points with the new texel coordinate point when the adjoining texel coordinate point that has a different address is a texel coordinate point following the input texel coordinate point.

22. The texture pattern memory apparatus of claim 20, wherein the group of texel coordinate points includes m texel data;

said reading means subtracting m from the input texel coordinate point to provide a new texel coordinate point and replacing one of the texel coordinate points of the group of texel coordinate points with the new texel coordinate point when the adjoining texel coordinate point that has a different address is a texel coordinate point prior to the input texel coordinate point.

23. The texture pattern memory apparatus of claim 20, wherein said reading means reads a plurality of texel data of greater than two texel coordinate points.

* * * * *